(12) United States Patent
Paruzel

(10) Patent No.: US 10,581,616 B1
(45) Date of Patent: Mar. 3, 2020

(54) MANAGING NODES OF A CRYPTOGRAPHIC HASH TREE IN A HASH-BASED DIGITAL SIGNATURE SCHEME

(71) Applicant: ISARA Corporation, Waterloo (CA)

(72) Inventor: Marek Paruzel, Kitchener (CA)

(73) Assignee: ISARA Corporation, Waterloo (CA)

( * ) Notice: Subject to any disclaimer, the term of this patent is extended or adjusted under 35 U.S.C. 154(b) by 0 days.

(21) Appl. No.: 16/508,809

(22) Filed: Jul. 11, 2019

(51) Int. Cl.
*H04L 9/32* (2006.01)
*H04L 9/06* (2006.01)

(52) U.S. Cl.
CPC .......... *H04L 9/3247* (2013.01); *H04L 9/0643* (2013.01)

(58) Field of Classification Search
CPC ... H04L 9/3228; H04L 9/3239; H04L 9/3247; H04L 9/0643; H04L 9/0861; H04L 9/14; H04L 9/30; H04L 2209/38; H04L 63/0442; H04L 63/061; H04L 63/062; H04L 63/067; H04L 63/0884; H04L 9/0819; H04L 9/0869; H04L 9/0891; H04L 9/3236; H04L 9/3242; H04L 9/3268
See application file for complete search history.

(56) References Cited

U.S. PATENT DOCUMENTS

| | | | |
|---|---|---|---|
| 4,309,569 A | 1/1982 | Merkle | |
| 5,432,852 A | 7/1995 | Leighton et al. | |
| 6,826,687 B1 | 11/2004 | Rohatgi | |
| 10,116,450 B1* | 10/2018 | Brown | H04L 9/3247 |
| 2008/0175392 A1 | 7/2008 | Ogura et al. | |
| 2008/0256631 A1 | 10/2008 | Zvi | |
| 2012/0096252 A1 | 4/2012 | Arditti et al. | |
| 2013/0142328 A1 | 6/2013 | Shibata et al. | |
| 2013/0159730 A1 | 6/2013 | Asim et al. | |
| 2014/0086412 A1 | 3/2014 | Shibata | |
| 2015/0244524 A1 | 8/2015 | Pulkas | |
| 2017/0357496 A1* | 12/2017 | Smith | G06F 8/65 |
| 2019/0319798 A1* | 10/2019 | Chalkias | H04L 9/30 |
| 2019/0319801 A1* | 10/2019 | Sastry | H04L 9/3247 |

OTHER PUBLICATIONS

Non-Final Office Action issued in U.S. Appl. No. 15/341,499 dated Oct. 18, 2017.
USPTO, Non-final Office Action in U.S. Appl. No. 15/341,499 dated Mar. 9, 2017.

(Continued)

*Primary Examiner* — Abiy Getachew
(74) *Attorney, Agent, or Firm* — Henry Patent Law Firm PLLC

(57) ABSTRACT

In some aspects, nodes of a cryptographic hash tree are stored in a buffer memory. Nodes of an active subtree are stored in a first set of indexed locations in the buffer memory, and nodes of a future subtree are stored in a second set of indexed locations in the buffer memory. A one-time signature (OTS) is generated based on a signing key associated with a current value of a signing index. An authentication path for the OTS is generated by retrieving a subset of the nodes from the buffer memory. A new node of the future subtree is calculated based on the current value of the signing index and stored in the buffer memory. The signing index is then advanced from the current value to a next value of the signing index.

30 Claims, 10 Drawing Sheets

(56) References Cited

OTHER PUBLICATIONS

USPTO, Notice of Allowance dated Aug. 28, 2018, in U.S. Appl. No. 15/341,499, 11 pgs.
USPTO, Final Office Action dated Mar. 15, 2018, in U.S. Appl. No. 15/341,499, 27 pgs.
USPTO, Final Office Action issued in U.S. Appl. No. 15/341,499 dated Jun. 13, 2017, 30 pages.
"Wikipedia, Merkle Signature Scheme, Feb. 2016 (3 pages)".
Arndt, "Matters Computational: Ideas, Algorithms, Source Code", 2010, 978 pgs.
Aysu, Aydin, et al., "Precomputation Methods for Faster and Greener Post-Quantum Cryptography on Emerging Embedded Platforms", Cryptology ePrint Archive: Report 2015/288, Mar. 2015, 24 pages.
Bernstein, Daniel, et al., "Post-Quantum Cryptography", Springer; ISBN: 978-3-540-88701-0, 2009, 248 pages.
Buchmann, et al., "A Practical Forward Secure Scheme based on Minimal Security Assumptions", Sep. 2013, 115 pgs.
Buchmann, Johannes, et al., "Merkle Tree Traversal Revisited", Post Quantum Crypography, vol. 5299 of Lecture Notes in Computer Science, pp. 63-78, Springer Berlin/Heidelberg, 2008, 17 pages.
Eisenbarth, Thomas, et al., "A Performance Boost for Hash-Based Signatures", Number Theory and Cryptography, vol. 8260, pp. 166-182, Springer Berlin/Heidelberg, 2013, 22 pages.
Huelsing, et al., "XMSS: Extended Hash-Based Signatures; Crypto Forum Research Group Internet-Draft", Feb. 2016, 56 pgs.
McGrew, David, et al., "Hash-Based Signatures", Crypto Forum Research Group Internet-Draft, Jun. 2017, 45 pages.
McGrew, et al., "Hash-Based Signatures; Crypto Forum Research Group Internet-Draft", Mar. 2016, 43 pgs.
McGrew, et al., "State Management for Hash Based Signatures", Cryptology ePrint Archive: Report 2016/357, Sep. 2016, 18 pgs.
Menezes, et al., "Handbook of Applied Cryptography; Chapter 11, CRC Press", 1997, 65 pgs.
Szydlo, Michael, "Merkle Tree Traversal in Log Space and Time", The Advances in Cryptology, EUROCRYPTO 2004, vol. 3027, pp. 541-554, 2004, 17 pages.

* cited by examiner

MANAGING NODES OF A CRYPTOGRAPHIC HASH TREE IN A HASH-BASED DIGITAL SIGNATURE SCHEME

BACKGROUND

The following description relates to managing a buffer memory that stores nodes of a cryptographic hash tree for a hash-based digital signature scheme.

Cryptosystems are used to communicate securely over public channels. Some cryptosystems provide authenticity through the use of digital signatures. A Merkle Signature Scheme (MSS) may utilize a cryptographic hash tree (e.g., a Merkle tree) and one-time signatures (OTS) to generate and verify a number of digital signatures for one public key.

DETAILED DESCRIPTION

Figure 1:
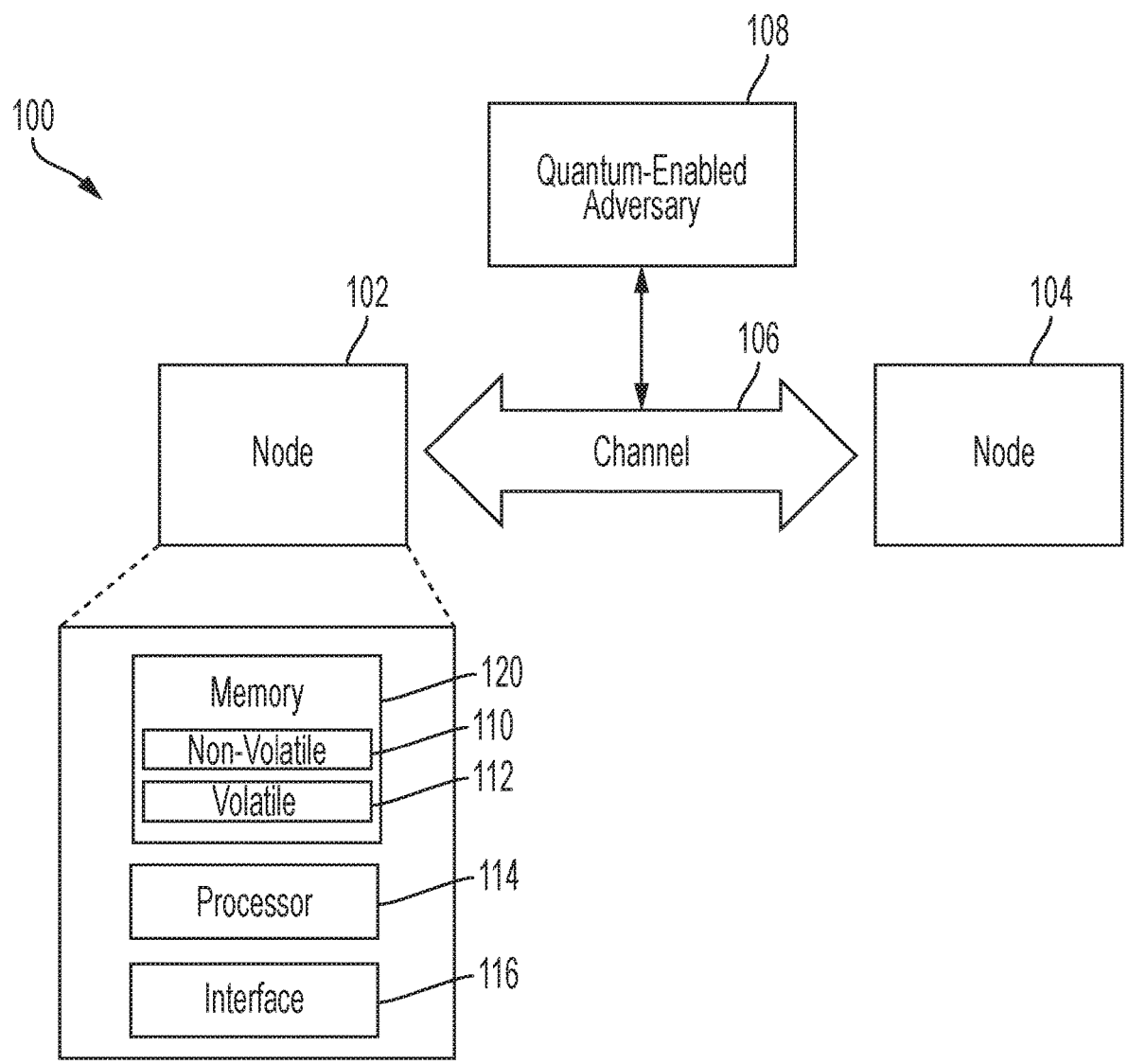
FIG. 1 is a block diagram showing aspects of an example communication system.

In some aspects of what is described here, a Merkle signature scheme (MSS) or another type of hash-based signature scheme utilizes a cryptographic hash tree (e.g., a Merkle tree) to generate and verify digital signatures in a communication system. The cryptographic hash tree may be generated based on verification keys of an OTS scheme. The leaf nodes of the cryptographic hash tree may be generated from respective verification keys, and each higher level node in the cryptographic hash tree may be generated based on the output of a hash function applied to a combination of the two nodes immediately below it in the cryptographic hash tree. The hash function may be any suitable hash function, and may be publicly-known. The hash function may be applied to the combination of the two lower-level nodes in any suitable manner. As an example, the hash function may be applied to a concatenation of the lower level nodes. In some aspects, a hash-based signature scheme scheme may use a cryptographic hash tree that is based on verification keys of a Lamport-Diffie OTS scheme, a Winternitz OTS scheme, or another type of OTS scheme.

Conventional MSS schemes are believed to be secure against attacks by quantum computers. However, the stateful nature of MSS schemes and their heavy reliance on hash functions have proven to be major deterrents to wide-spread adoption. In a scenario where all OTS signing and verification keys and all the nodes of a Merkle tree have been computed and stored together in an accessible memory, the only signature computation required is the generation of the OTS and the construction of the authentication path from the nodes of the Merkle tree. In this scenario, the performance impact of signature generation is minimal because all necessary data is available and need not be recalculated. However, on resource constrained devices, it is often not possible to store such a large amount of data. Additionally, the computation required to regenerate the signing and verification keys from a seed, and to produce an authentication path, is computationally intensive.

Accordingly, aspects of the systems and techniques described here can be used to improve the operation of communications systems (e.g., data networks, etc.), computer systems (e.g., network-connected computers, etc.), smart devices (e.g., so-called "Internet-of-Things" (IoT) devices, etc.) and other classes of technology. For example, a wide variety of modern technologies rely on computer-implemented cryptosystems for secure operation, and the techniques described here can improve such computer-implemented cryptosystems, for example, making them more secure, more computationally efficient or providing other advantages in some instances. In some implementations, the systems and techniques described here can utilize memory resources more efficiently by computing and storing certain data elements when they are needed to generate a digital signature (e.g., deriving OTS signing and verification keys from a small seed, generate nodes of the cryptographic hash tree when they are needed for an authentication path, etc.). In some cases, the systems and techniques described here can make hash-based signature schemes more feasible on embedded devices, for example, making it possible to shrink the private key and generate authentication paths while providing fast signature generation with low memory and processor utilization.

In some implementations, rather than storing each node of the cryptographic hash tree, only a subset of nodes are stored in memory to reduce memory consumption (e.g., in embedded devices, such as, for example, smart cards). Because only a subset of the nodes are stored, additional nodes may be computed and stored as the signature scheme proceeds to use additional OTS signing and verification keys. The computation and storage of the additional nodes may be executed according to a tree traversal scheme. In some cases, optimized tree traversal schemes may minimize processor utilization during signing while also achieving lower memory consumption.

In some implementations, caches may be used to store components of a cryptographic hash tree. The caches may include a TopNodesCache that stores a subset of nodes of the cryptographic hash tree above a cut-off level, and a BottomNodesCache that stores a subset of nodes below the cut-off level. The BottomNodesCache may contain a set of nodes from an active subtree and a set of nodes from a future subtree (e.g., as described with respect to FIG. 4). In some cases, the caches may include an OTSCache that stores OTS states. In some implementations, each time a new OTS signature is created according to the hash-based signature scheme, the BottomNodesCache is updated, for example, by adding a new node of the future subtree to the BottomNodesCache, and adding a new leaf node of the active subtree to the BottomNodesCache. In some implementations, the combination of the TopNodesCache and the BottomNodesCache provides all the right nodes that are needed to generate the new node of the future subtree, and to create an authentication path.

In some aspects, using the TopNodesCache and the BottomNodesCache may reduce the cost of future hash and authentication path computations. For example, in some cases, it is only necessary to calculate one leaf node of the cryptographic hash tree per signature generation, thus reducing memory consumption. For example, a subset of right-hand nodes may be stored in memory, reducing the memory costs associated with implementing a full cryptographic hash tree. Further, the computational cost of future hash computations can be significantly reduced by storing fewer nodes, and generating one new node of a future subtree to be used in generating OTS signatures for that subtree. As a result, in some instances, fewer tree traversal hash operations may be required to generate a digital signature and update the tree state while preserving a small memory and storage footprint. In some cases, a substantial reduction in the computation load during OTS generation may be realized. Further, in some cases, tree traversal schemes described herein may be implemented on memory- or computationally-limited devices, such as, for example, smart cards.

The example communication system 100 shown in FIG. 1 includes two devices 102, 104. The devices use a cryptographic scheme to communicate with each other over a network, e.g. over network channel 106. In the example shown, a quantum-enabled adversary 108 has access to the channel 106, information exchanged on the channel 106, or both. In some instances, the quantum-enabled adversary 108 can transmit or modify information on the channel 106. The communication system 100 may include additional or different features, and the components in a communication system may be configured to operate as shown in FIG. 1 or in another manner.

In some implementations, devices in the communication system 100 may have a server-client relationship. For example, the device 102 can be a server and the device 104 can be its client, or vice-versa. In some implementations, devices in the communication system 100 may have a peer-to-peer relationship. For example, the devices 102, 104 can be peers in a served network, in a peer-to-peer network or another type of network. Devices may have another type of relationship in the communication system 100.

In the example shown in FIG. 1, the example devices 102, 104 each have computational resources (e.g., hardware, software, firmware) that are used to communicate with other devices. In some implementations, devices in the communication system 100 can be implemented in various systems, such as, for example, laptops, desktops, workstations, smartphones, tablets, personal digital assistants, servers, server clusters, mainframes, and other types of computer systems. As shown in FIG. 1, the example device 102 includes memory 120, which may include a non-volatile memory 110, a volatile memory 112, a processor 114, and an interface 116. Each of the devices 102, 104 may include the same, additional or different components. The devices 102, 104 may be configured to operate as shown and described with respect to FIG. 1 or in another manner.

In the example shown in FIG. 1, the entities represented by the devices 102, 104 may correspond to a computing device, a computer system, an IP address or other network address, or another type of computer-readable identifier or instance of a computer resource. Accordingly, the computations and other operations of each entity may be performed by one or more processors or other elements of the respective device 102, 104. Similarly, information sent to or received by an entity may be sent to or received by an element (e.g., one or more processors, memories, or interfaces) of the respective device 102, 104.

The example non-volatile memory 110 may be used for long-term persistent storage of data. The non-volatile memory 110 can include, for example, a storage device (e.g., a read-only memory (ROM), flash memory, optical disks), a hard disk drive (HDD), or another similar type of non-volatile storage medium. The volatile memory 112 may be used during operation of the processor 114, for example, to store instructions and data that are accessed and executed by the processor 114. The volatile memory 112 can include, for example, certain types of random access memory (RAM), such as dynamic RAM (e.g., dynamic double data rate synchronous dynamic RAM (DDR SDRAM)).

Instructions (e.g., computer code, a computer program, etc.) associated with an operating system, computer applications, or other resources may be stored on non-volatile memory 110, the volatile memory 112, or a combination thereof. In addition, the non-volatile memory 110, the volatile memory 112, or a combination thereof can also store application data and data objects that can be interpreted by one or more applications or virtual machines running on the device 102. The device 102 can be preprogrammed, or it can be programmed (and reprogrammed), by loading a program from another source (e.g., from a removable memory device, from a remote server, from a data network, or in another manner). In some cases, the non-volatile memory 110, the volatile memory 112, or a combination thereof stores computer-readable instructions for software applications, scripts, programs, functions, executables or other modules that are interpreted or executed by the processor 114. For example, the computer-readable instructions can be configured to perform one or more of the operations shown in FIG. 9 and described further below.

In the example device 102 shown in FIG. 1, the processor 114 can execute instructions, for example, to generate output data based on data inputs. For example, the processor 114 can run computer programs by executing or interpreting the software, scripts, programs, functions, executables, or other modules stored in the non-volatile memory 110, the volatile memory 112, or a combination thereof. In some instances, the processor 114 may perform one or more of the operations shown in FIG. 9 and described further below.

The example processor 114 shown in FIG. 1 can include one or more chips or chipsets that include analog circuitry, digital circuitry or a combination thereof. In some cases, the processor 114 includes multiple processor devices such as, for example, one or more main processors and one or more co-processors. For instance, the processor 114 may include a main processor that can delegate certain computational tasks to a cryptographic co-processor, which may be configured to perform the computational tasks more efficiently than the main processor or in parallel with other computational tasks performed by other processor devices. In some instances, the processor 114 coordinates or controls operation of other components of the device 102, such as, for example, user interfaces, communication interfaces, peripheral devices and possibly other components.

In the example device 102 shown in FIG. 1, the interface 116 provides communication with other devices (e.g., via channel 106). In some cases, the interface 116 includes a wireless communication interface that provides wireless communication using various wireless protocols or standards. For example, the interface 116 may provide wireless communication via Bluetooth, Wi-Fi, Near Field Communication (NFC), CDMA, TDMA, PDC, WCDMA, CDMA2000, GPRS, GSM, or other forms of wireless communication. Such communication may occur, for example, through a radio-frequency transceiver or another type of component. In some cases, the interface 116 includes a wired communication interface (e.g., USB, Ethernet) that can be connected to one or more input/output devices, such as, for example, a keyboard, a pointing device, a scanner, or a networking device such as a switch or router, for example, through a network adapter.

The example channel 106 can include all or part of a connector, a data communication network or another type of communication link. For example, the channel 106 can include one or more wired or wireless connections, one or more wired or wireless networks or other communication channels. The channel 106 may have any spatial distribution. The channel 106 may be public, private, or include aspects that are public and private. For instance, in some examples, the channel 106 includes one or more of a Local Area Network (LAN), a Wide Area Network (WAN), a Virtual Private Network (VPN), the Internet, a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

In the example shown, the quantum-enabled adversary 108 has access to quantum computational resources. For example, the quantum-enabled adversary 108 can be, include, or have access to a quantum computer, a quantum information processor, a quantum memory, a quantum communication interface or a combination of these and possibly other quantum technologies. In some implementations, the quantum-enabled adversary 108 can include a hybrid computing system, for instance, that includes a quantum processor driven by a classical front-end processor, or another type of hybrid computing system.

In some examples, the quantum-enabled adversary 108 can store and process information in a quantum system. For instance, the quantum-enabled adversary 108 may encode information as quantum bits ("qubits") and process the information by manipulating the qubits. The information may be encoded in physical qubits, logical qubits, or a combination of these and other types of qubits encodings. In some implementations, the quantum-enabled adversary 108 can operate in a fault-tolerant regime, or the quantum-enabled adversary may operate below the fault-tolerant regime.

Many public-key cryptosystems are known to be insecure against an attacker armed with a scalable quantum computer. The threat of quantum computers to public key cryptography can be mitigated by switching to other public key cryptosystems that are believed to be invulnerable to quantum attack. For example, certain hash-based signature schemes have been proposed as quantum-resistant replacements for certain RSA-based or ECC-based cryptosystems that are believed to be quantum-vulnerable.

In some implementations, the example quantum-enabled adversary 108 can perform quantum computing algorithms, execute quantum computing circuits or quantum communication protocols, or perform other types of quantum information processing tasks. In the example shown, the quantum-enabled adversary 108 can perform Shor's algorithm, which allows the quantum-enabled adversary to efficiently solve problems that are believed to be difficult to implement on a classical computer. For example, the quantum-enabled adversary 108 may use Shor's algorithm to factor large integers, find discrete logarithms or possibly to solve other problems in a computationally-efficient manner. Accordingly, the example quantum-enabled adversary 108 can compromise the security of certain quantum-vulnerable cryptosystems (e.g., by computing a private key of a certificate authority or other entity based on public information).

The example quantum-enabled adversary 108 shown in FIG. 1 can access information exchanged on the channel 106. For example, the quantum-enabled adversary 108 may access some or all of the information exchanged between the devices 102, 104. In some instances, the quantum-enabled adversary 108 can directly observe correspondence on the channel 106; in some instances, the quantum-enabled adversary 108 indirectly obtains such correspondence, for example, by receiving information observed on the channel 106 by another entity or system.

In some implementations, the quantum-enabled adversary 108 can factor integers, compute discrete logarithms or perform other classically-hard computational tasks fast enough to compromise the security of certain cryptosystems. For example, the quantum-enabled adversary 108 may be capable of computing prime factors fast enough to compromise certain RSA-based cryptosystems or computing discrete logarithms fast enough to compromise certain ECC-based cryptosystems.

In the example shown in FIG. 1, the devices 102, 104 may use a quantum-resistant cryptosystem that cannot be compromised by the example quantum-enabled adversary 108. For instance, the devices 102, 104 may communicate using a cryptosystem that is secure against a quantum computer that can efficiently execute Shor's algorithm or other types of algorithms that are known to compromise the security of certain conventional cryptography standards.

In some implementations, the devices 102, 104 use a digital signature scheme that allows each node to verify the sender of messages received. The devices 102, 104 can use the example techniques shown in or described with respect to any one or more of FIGS. 2A, 2B, 3A, 3B, 4, 5, 6, 7, 8, 9, or the devices 102, 104 may use variations of these and other techniques to communicate in the channel 106.

In some implementations, the devices 102, 104 use a hash-based signature scheme in their communications over the channel 106. The hash-based signature scheme may utilize an OTS scheme and a cryptographic hash tree to generate and verify digital signatures. Examples of OTS schemes that may be used with a hash-based signature scheme include a Lamport-Diffie OTS scheme and a Winternitz OTS scheme. In some implementations, the signing device (102 or 104) stores only a subset of the nodes of the cryptographic hash tree at a time, and manages the tree traversal as described below with respect to FIGS. 2A-9.

Figure 2A:
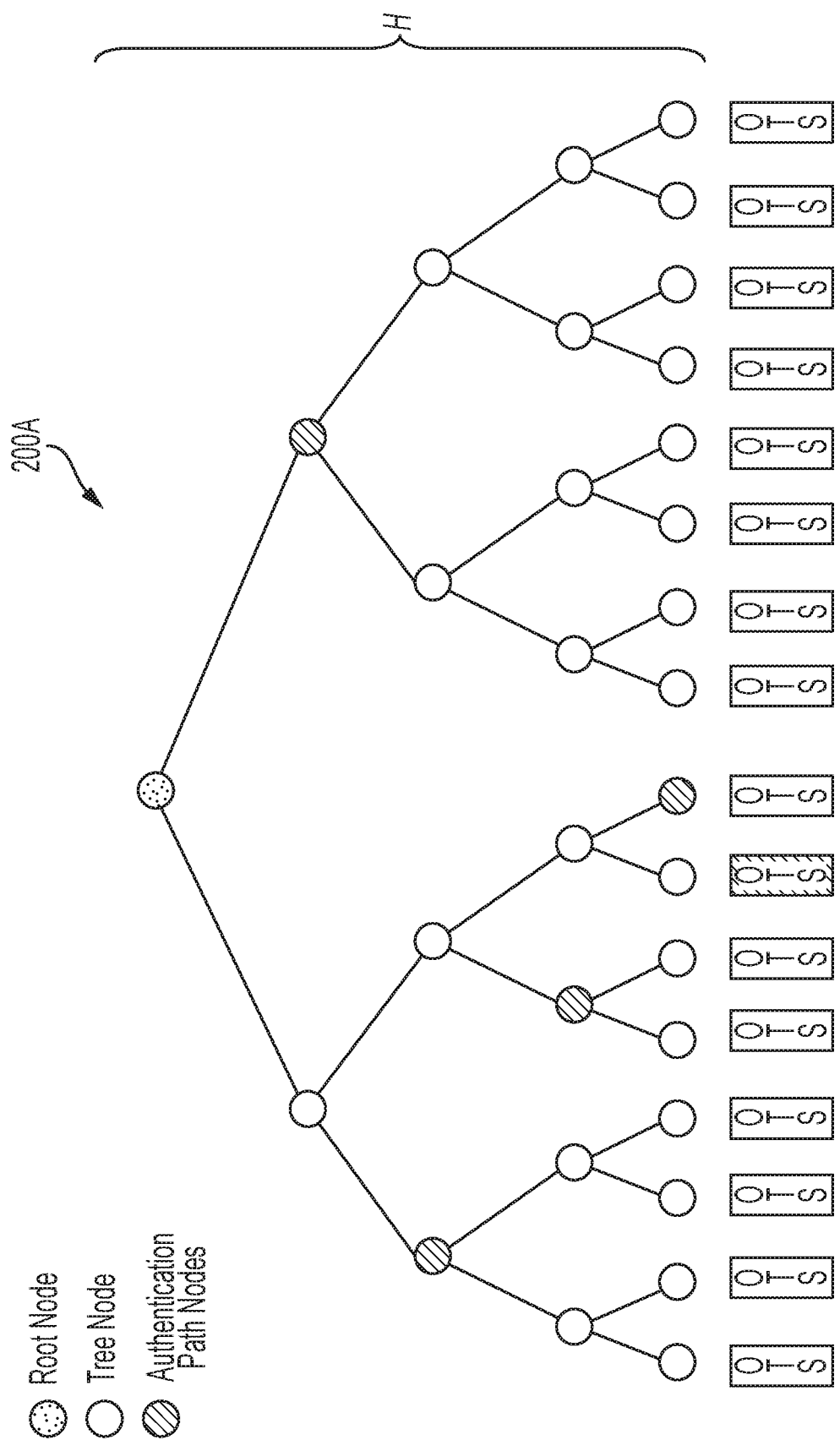
FIG. 2A is a diagram showing an example cryptographic hash tree for use with a hash-based signature scheme.

FIG. 2A is a diagram showing an example cryptographic hash tree 200A for use with a hash-based signature scheme. In some cases, a cryptographic hash tree 200 may have a large number of levels (e.g., with a height of approximately 10 levels, 20 levels or more levels), and storing all of the nodes in the tree may be non-optimal or impossible (e.g., on memory-limited devices, such as smart cards). On the other hand, the cost of generating a leaf node in a cryptographic hash tree is measured by the number of hash operations required to generate a verification key. For the latter case, although the amount of memory required may be sufficiently reduced to fit on a small device, the signature generation time may be too slow to be practical. In some cases, tree traversal schemes described herein can minimize or otherwise reduce processor utilization during signing, to achieve fast signature generation with reasonably small memory overhead by employing the techniques illustrated in FIGS. 2A-9.

As an overview, FIG. 2A illustrates a simplified hash tree. In some instances, a complete hash tree is computed during key pair generation. In this example, a hash tree is a binary tree where a node is a hash of the concatenation of its two child nodes. A height H hash tree has H+1 levels, where the bottom nodes are on level 0 and the root node is on level H. The number of nodes $l_i$ at the level i is given by:

$$l_i = 2^{H-i}, i = 0, 1, \ldots, H$$

At each level i, the node position is indexed from left to right by 0 to $2^{H-i}-1$. In this example, the nodes with even number indices are referred to as left nodes (or left-hand nodes), and those with odd number indices right nodes (or right-hand nodes). In some cases, the node position may be indexed based on a different starting index. For example, if starting index is an odd number, e.g. starting index=1, then in that case, the odd number indices are left nodes and the even number indices are right nodes. In some cases, whether a node is a left node or a right node may be determined by the order of traversal.

The value of an intermediate node in a hash tree (e.g. a node at a level higher than level 0), $Node_j^i$, at level i, i=1, 2, ..., H and position j, j=0, 1, ..., $2^{H-i}-1$, is computed from its children by a Hash function:

$$Node_j^i = Hash(Node_{2j}^{i-1} \| Node_{2j+1}^{i-1})$$

where $\|$ denotes concatenation and Hash(•) is a cryptographic hash function. The value of a leaf node (e.g. a node at level 0), $Node_j^0$, j=0, 1, ..., $2^H-1$, is the hash of the corresponding verification key of the underlying OTS algorithm:

$$Node_j^0 = Hash(OTS\_Ver_j)$$

where $OTS\_Ver_1$ is the OTS verification key at the OTS index j.

Note that an intermediate node, $Node_j^i$, uniquely identifies a subtree of the hash tree. Thus, the left most leaf node of such a subtree can easily be identified once an intermediate node is chosen:

$$LeftLeaf^{Node_j^i} = j \times 2^i$$

Some OTS algorithms are hash based. Some example OTS algorithms (e.g., the Winternitz OTS) includes the following components: a signing key, a verification key, and a signature. In some cases, using the OTS signing key, SigKey, the OTS verification key is computed as:

OTS_Ver=OTSPUB(Sig_Key)

The OTS Signing Algorithm can produce an OTS signature, OTS_Sig, from the signing key, SigKey, and an input message m:

OTS_Sig=OTSSIG(m,SigKey)

A candidate OTS verification key may be computed using the OTS verification algorithm:

OTS_VerResult=OTSVER(m,OTS_Sig)

The OTS signature is valid if OTS_VerResult is equal to OTS_Ver.

In an example, a digital signature in a hash-based signature scheme may be provided as:

(q,OTS_Sig$_q$,AuthPath$_q$)

where:
q is an OTS index (an example of a signing index) that indicates the position of a signing-verification key pair, which maps to the position of a leaf at level 0, e.g. $Node_q^0$, in the hash tree;
OTS_Sig$_q$ is the OTS for a position represented by index q; and
AuthPath$_q$ is the authentication path for Nod which is comprised of multiple authentication nodes in the hash tree.

In the example shown in FIG. 2A, an authentication path is represented as a set of nodes from each level of the hash tree. Each node in the hash tree (other than the root) shares a common parent with another node, called its sibling node. The authentication path contains the nodes that are siblings of the nodes on the path from the leaf node to the root. In some cases, an authentication path can include H node values, each of which corresponds to a different level of the hash tree from 0 to H−1. The level H node is excluded because it is the root node, which is the public key. Therefore, the recipient/verifier already has this value.

In the example in FIG. 2A, the nodes of an authentication path for a particular OTS are illustrated by the shaded nodes. If the nodes needed by the authentication path are not stored, then those nodes would need to be recomputed. In some cases, computation of each tree node in a tree of height H may involve $2^H$ OTS verification key calculations and $2^H-1$ hash operations. Thus, for example, a hash tree with a height of 14, may require 16,383 tree node hash operations and 16,384 OTS verification key computations. OTS verification key computations may further require $2^w \times p$ hash operations, where w and p are parameters of the Winternitz OTS scheme.

In some cases, the number of leaf node calculations during a signing operation can be reduced using cache memory to store a subset of nodes of at each level of a hash tree. For example, right nodes may be stored in cache memory and reused for authentication path construction. On the other hand, left nodes can be easily computed because the necessary child node values have already been computed in past signature generations.

Figure 2B:
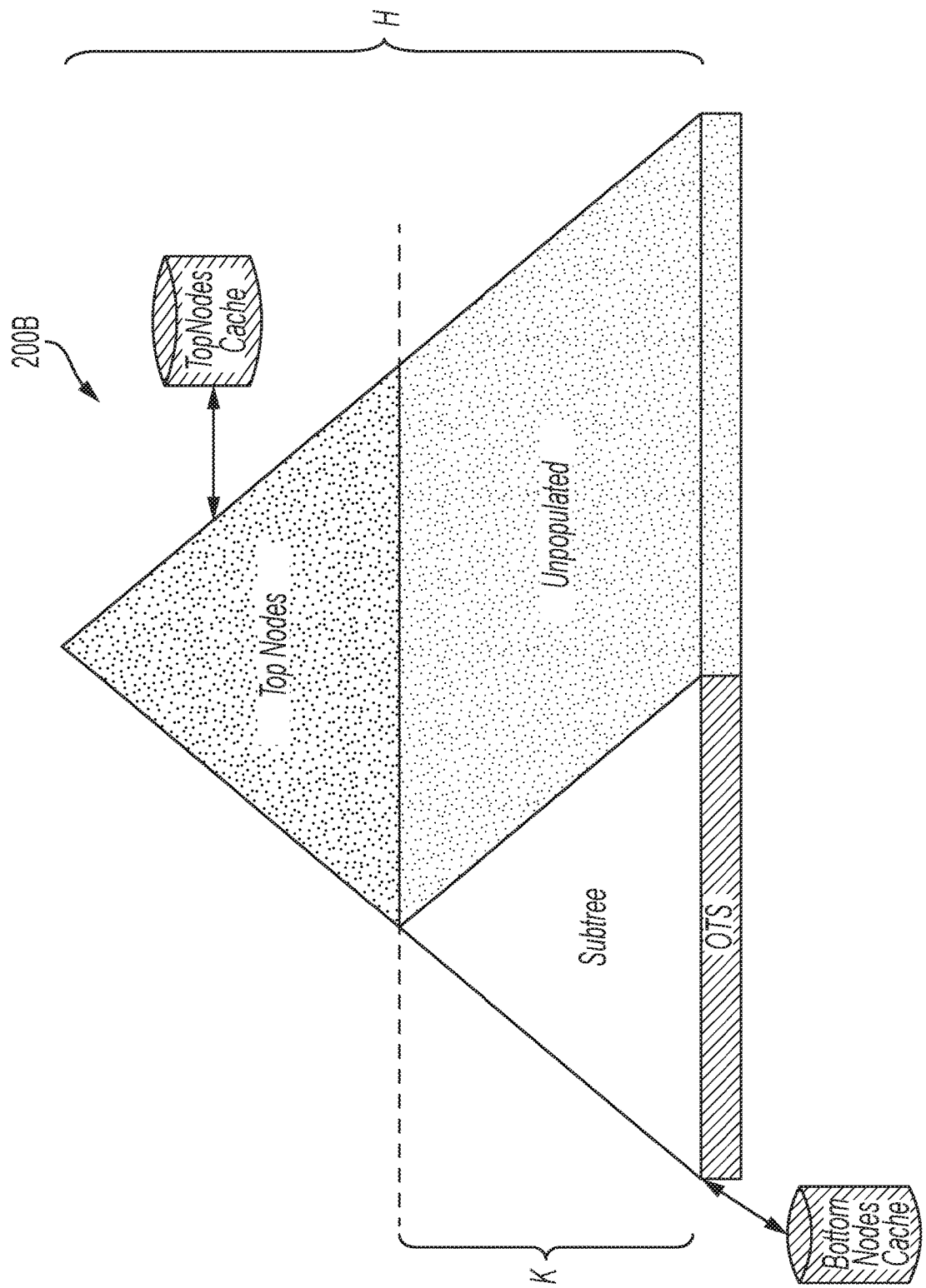
FIG. 2B illustrates an example of separation of an H-level cryptographic hash tree into two layers.

FIG. 2B illustrates an example of a cryptographic hash tree 200B of height H separated into two layers. As shown, the top part of the tree is a fixed height H−K, where 0<K<H. The TopNodesCache is a memory component that stores select nodes from the Top Nodes depicted in FIG. 2B. In some instances, the values of all the right nodes in the top part of the tree may be stored in the TopNodesCache.

Also as shown in the example of FIG. 2B, the BottomNodesCache is a memory component where certain nodes of the bottom K levels of the tree are stored. These nodes are depicted as Subtree in FIG. 2B. Example processes for determining the nodes of the Subtree are described below. In some cases, only certain nodes of the K levels are stored in BottomNodesCache, and the remaining portion of the nodes of a full hash tree at the K levels are not stored, depicted as Unpopulated nodes. In some instances, the generation of nodes acts a sliding window that moves from left to right. In some cases, as OTS signatures are generated along the OTS index from left to right, subsequent right node values of the hash tree are prepared and stored in the BottomNodesCache. In some case, an OTSCache is employed in which OTS states are prepared as a product of leaf calculations, for example, as described below.

Figure 3A:
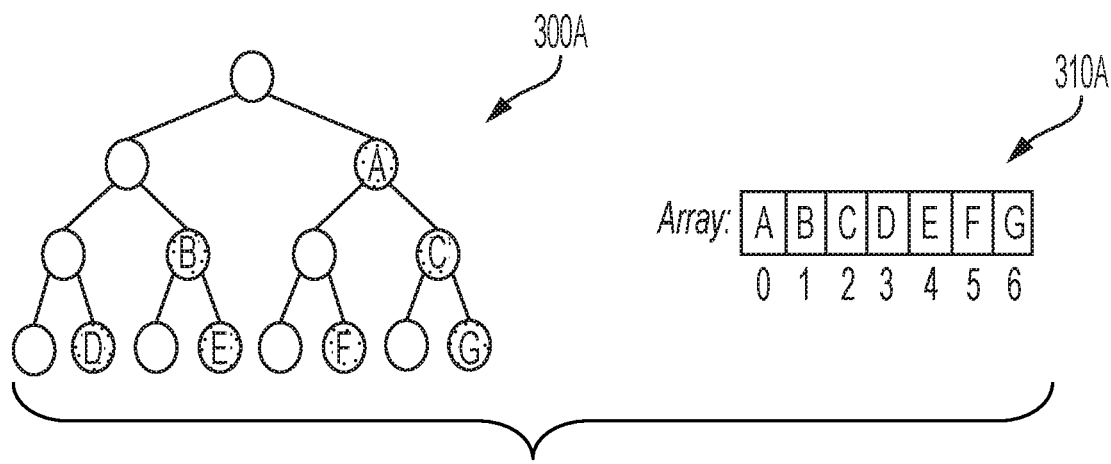
FIGS. 3A and 3B illustrate an example array representation of the nodes of a cryptographic hash tree.
Figure 3B:
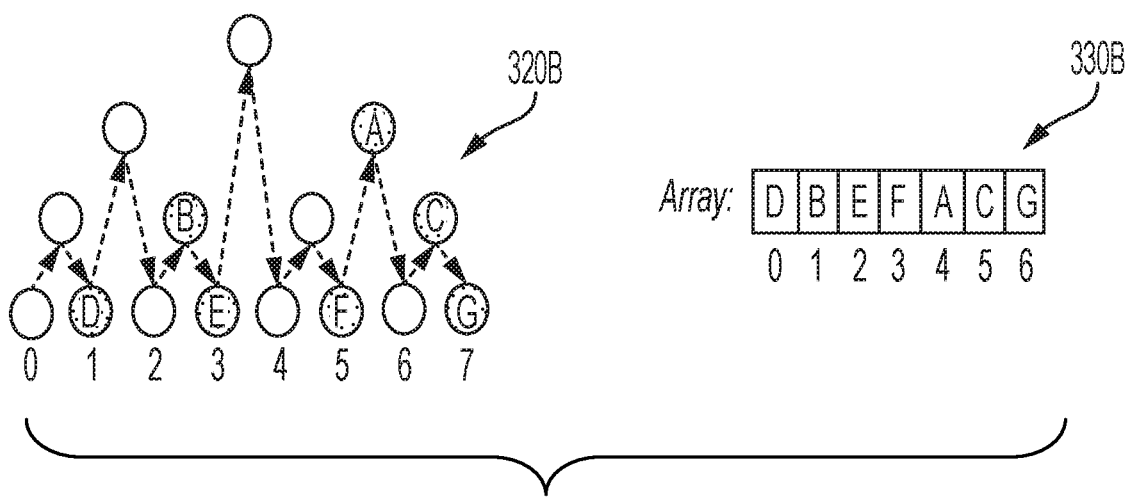

FIGS. 3A and 3B are examples illustrating an array representation of the nodes of a cryptographic hash tree. In FIG. 3A, an array 310A represents memory that stores the nodes of the top part of an example hash tree. In this example, the top part of the hash tree is of height H−K, for example, Top Nodes illustrated in FIG. 2B. In some cases, the values of all the right nodes in Top Nodes of hash tree 300A are stored and indexed by the tree level, k, and the position, i. In some instances, the array 310A contains $2^{H-K-1}$ nodes at initialization time and mutates over the lifespan of the hash-based signature scheme key pair. In some implementations, the array 310A stores nodes of the top tree in a binary tree layout according to Eytzinger's Method. In the example shown, the right nodes of the binary tree are stored in order in the array based on level and position, e.g., from A to G.

In FIG. 3B, an array 330B represents memory that stores select nodes of subtrees for the bottom K-levels of the hash tree, e.g., the subtree 320B shown in FIG. 3B. In some cases, the array 330B is initialized with a specific number of node values, and then updated at each signature generation. In some implementations, the array 330B is implemented as a special circular buffer with space for $2^K+(K-2)$ nodes. In some cases, nodes from the subtrees are not stored in the array 330B in a binary tree layout. Rather, in some cases, the nodes are ordered in such a way that removal of nodes from the array 310B coincides with the lifetime of the nodes in the hash-based signature scheme. To accomplish this, in some implementations, the array 310B is a circular buffer that stores right nodes in the order they are encountered when executing an in-order traversal of the tree. The result is an array that is ordered by the lifetime of the nodes. In other words, nodes on the left side of the tree will be used first in an authentication path computation while nodes on the right side of the tree will be used last. Likewise, the nodes on the left side (least significant index) of the array 330B may be removed prior to the nodes on the right (most significant index). For example, the nodes in the array 330B shown in FIG. 3B may be removed in order, such that nodes D, B, E have the shortest life and are removed first (from left to right), while nodes A, C, G have the longest life and are removed last (from left to right).

In some implementations, the nodes of a future subtree are not created in a manner that allows an in-order traversal of the nodes. For example, the nodes in the array may be are arranged in a circular buffer in inverse lexicographic order. In some cases, an inverse function may be used to insert nodes into the array in inverse lexicographic order as the future subtree is built node-by-node, for example, as described below with respect to FIG. 5.

Figure 4:
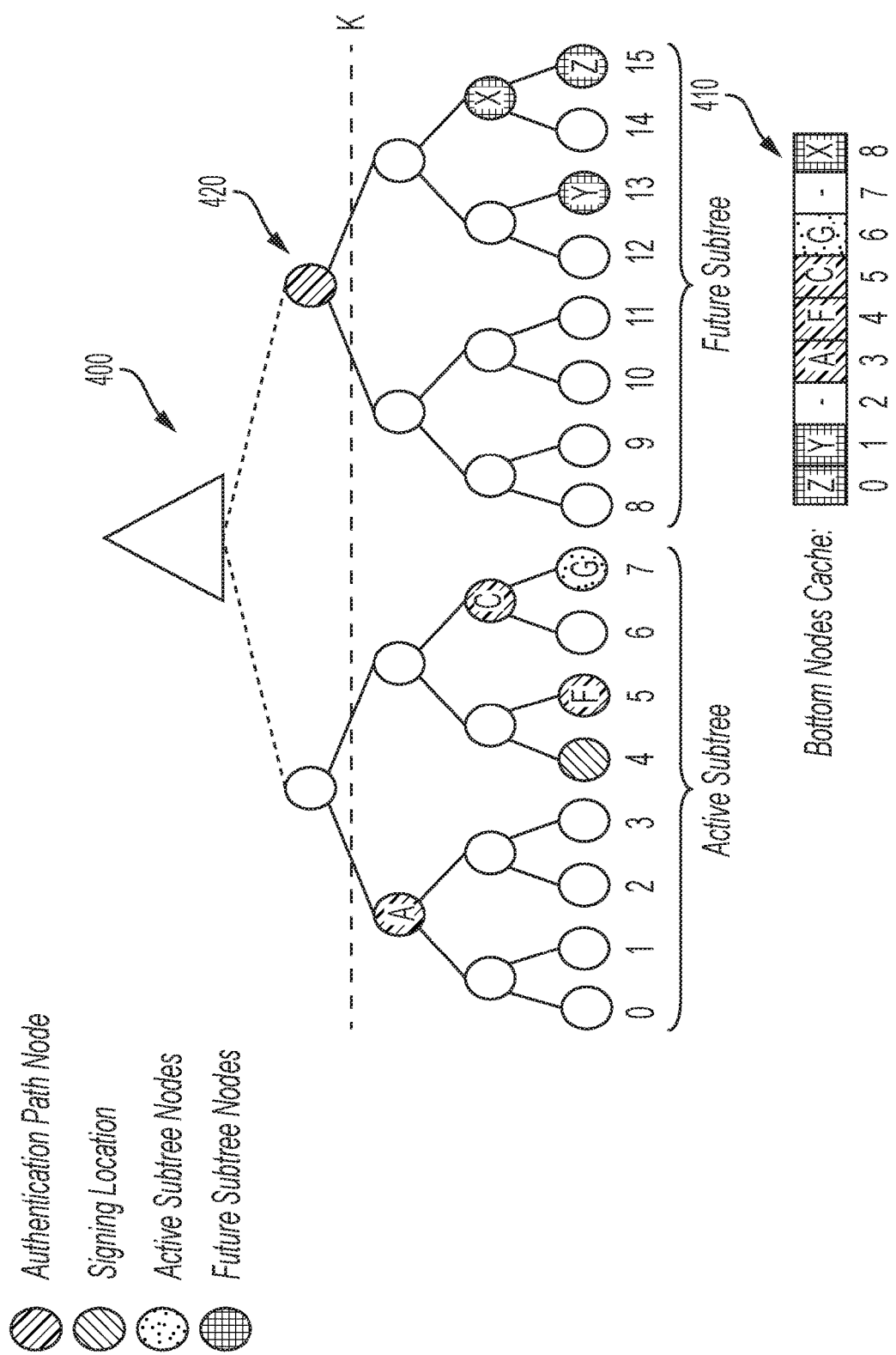
FIG. 4 illustrates an example of a scheme for managing nodes of a cryptographic hash tree.

FIG. 4 illustrates an example of a scheme for managing nodes of a cryptographic hash tree 400. In some implementations, a hash-based signature scheme manages the nodes of a hash tree using an buffer memory array such as, for example, the BottomNodesCache 410 shown in FIG. 4. In some instances, the example BottomNodesCache 410 maintains both active subtree nodes and future subtree nodes in the same buffer memory array. The active and future subtrees are each height K subtrees having nodes from the lower levels of the cryptographic hash tree. In some implementations, the active subtree is the subtree being used to generate a signature and authentication path, for example, based on a signing key associated with the current signing index q; while the future subtree is progressively built, node-by-node, so that once the active subtree is exhausted (e.g. has used all its OTS signing keys), the future subtree can be used to generate signatures (when the signing index is eventually advanced to a value associated with the future subtree). For example, by the time the active subtree is exhausted, the future subtree may fully built and ready to become the active subtree.

In the example shown in FIG. 4, a subset of nodes of the active subtree are stored at a first set of indexed locations in the BottomNodesCache 410 (locations having indices 3, 4, 5, 6), and while a subset of nodes of the future subtree are stored at a second set of indexed locations in the BottomNodesCache 410 (locations having indices 8, 0, 1). The example BottomNodesCache 410 in FIG. 4 is implemented in a circular buffer memory, and the first set of indexed locations (locations having indices 3, 4, 5, 6) are contiguous, and the second set of indexed locations (locations having indices 8, 0, 1) are also contiguous.

In some implementations, the BottomNodesCache 410 is implemented as a circular buffer array, such that a shrinking active subtree and a growing future subtree are stored in a single, shared storage array. In some instances, the nodes within each subtree are guaranteed to have a storage location within the circular buffer, for example, when the BottomNodesCache 410 is implemented with the following properties: (1) the number of stored nodes of the active subtree shrinks as digital signatures are computed, thus releasing storage space within the circular buffer; and (2) the number of stored nodes of the future subtree grows at a rate of 1 new node per signature, occupying the released storage space within the circular buffer. In some implementations, the shrinking active subtree nodes do not fragment in the buffer when nodes are removed. Rather, the stored active subtree stays contiguous as it shrinks. This allows the future subtree nodes to grow into a contiguous vacant space within the cache. Using a circular buffer may ensure that used and unused space of the active and future subtrees remains contiguous. As such, in some instances, storing the new node of the future subtree in the circular buffer memory may shift one or more boundaries between the first and second sets of indexed locations in the circular buffer memory.

In some instances, after a signature is generated, certain nodes in the active subtree will no longer be used in any future signature or authentication path computations. In some cases, these nodes are removed or replaced with their sibling nodes. In some cases, the portion of the BottomNodesCache 410 where the active subtree nodes are stored shrinks as signatures are computed and used. Conversely, the future subtree also updates after a signature generation such that it is progressively built. In some examples, the portion of the BottomNodesCache 410 where the future subtree nodes are stored grows with the addition of each new node. In some implementations, the BottomNodesCache 410 is managed by indexing functions for managing a circular buffer so that nodes from the future subtree do not overwrite nodes of the active subtree.

In the example in FIG. 4, the active subtree is used for generating signatures when the current value of the signing index is in the range of 0-7. When a signature has been generated for index 7, the active subtree will be out of OTS signing keys and no nodes from the active subtree are needed any further. In this case, the future subtree will become the active subtree and signatures will generated for values of the signing index in the range 8-15, etc. As further illustrated in FIG. 4, the active subtree nodes, e.g. A, F, C, and G (which are stored at index 3, 4, 5, and 6) and the future subtree nodes X, Z, Y (which are stored respectively at indices 8, 0, and 1) share the same memory (BottomNodesCache 410).

As shown in FIG. 4, the current signing location in the active subtree is at index 4 (the signing index q=4), and an authentication path includes nodes A, F, and C in the active subtree. In some instances, BottomNodesCache 410 stores only authentication path nodes in the lower K levels of the hash tree. In some implementations, as illustrated, active subtree nodes are grouped together in consecutive locations, and the future subtree nodes are also grouped together in consecutive locations. In some instances, the group of nodes may wrap around the BottomNodesCache, as it is a circular buffer. In some implementations, BottomNodesCache is of fixed size. In the example in FIG. 4, the future subtree node X is in the last slot at index 8 of BottomNodesCache 410 and future subtree nodes (e.g. Z and Y) wrap around to the beginning of the circular buffer at indices 0 and 1, respectively. In some instances, the active subtree portion of BottomNodesCache does not shrink linearly. For example, the active subtree nodes portion may decrease by 0, 1, or more nodes for each signature generation. On the other hand, the future subtree nodes portion may increase at a constant rate of one node upon each signature generation.

In some implementations, an algorithm may be used to create nodes for the BottomNodesCache. In some cases, an algorithm to create nodes may be based on a variation of the conventional TreeHash algorithm described in the publication by M. Szydlo entitled "Merkle Tree Traversal in Log Space and Time" (Advances in Cryptology, EUROCRYPTO 2004, pp. 541-554). In some examples, an algorithm to create the nodes uses a circular buffer, rather than a stack structure, to manage the state of a BottomNodesCache (e.g. BottomNodesCache 410 shown in FIG. 4). In the systems and techniques described here, an algorithm that iterates through the leaf nodes of the subtree in descending order (effectively building the subtree in reverse compared to a conventional TreeHash algorithm) is referred to as "TreeHash$_v$."

Accordingly, the TreeHash$_V$( ) function described herein computes a single iteration of the TreeHash variant algorithm. As input, this function takes in a leaf node, Node$_s^0$, at index s, which denotes the location of a leaf node that was created, and h, the height of a derived right-hand node that is to be computed. This function returns a node value for the newly created node within the tree. In some examples, the TreeHash$_V$( ) algorithm may operate as follows:
1. Let TempNode=Node$_s^0$.
2. For i=0→h:
   a. Let r=GetAuthPathIndex(q, i).
   b. Let SiblingNode=BottomNodesCache$_r$.
   c. TempNode=NodeCalc(TempNode, SiblingNode).
3. Return TempNode.

Figure 5:
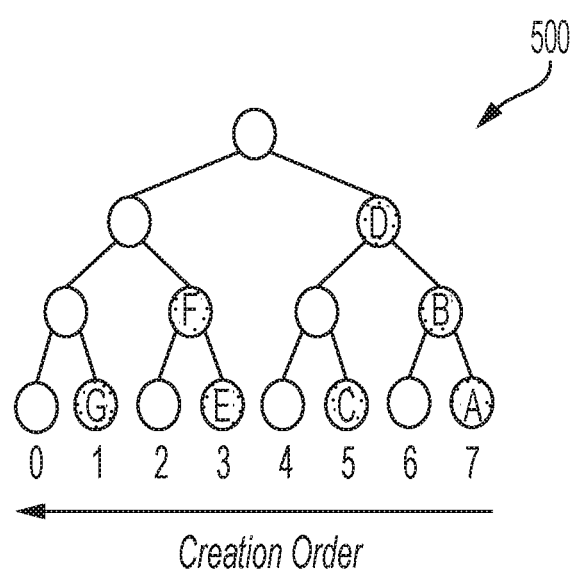
FIG. 5 illustrates an example creation order of nodes for a subtree of a cryptographic hash tree.

FIG. 5 illustrates an example creation order of nodes for a subtree 500 of a cryptographic hash tree. In some implementations, each of the nodes of subtree 500 may be generated using the TreeHash$_v$ algorithm. In some cases, the nodes created according to the example creation order shown in FIG. 5 are populated into a memory to produce the array 330B shown in FIG. 3B. In the example shown in FIG. 5, node A (index 7) is created first, followed by the sibling node of A (index 6). To produce node B, node A and its sibling node are input into NodeCalc( ). In some cases, a property of the TreeHash$_v$ function is that all necessary sibling nodes are available for creating a respective parent node. Therefore, to create node D, node C's sibling (index 4) is combined with node C (index 3) to produce the sibling node of B; which is then combined with node B to produce node D. In this example, the left-most leaf node of the subtree, which is the sibling to node G, is never computed because no right node is yielded from its computation. Therefore, this node may be ignored. Additionally, the example TreeHash$_v$ algorithm below does not discard all used nodes. Instead, right nodes are saved and left nodes are discarded, as highlighted in FIG. 5. Thus, the TreeHash$_v$ algorithm may allow better integration with the TopNodesCache and BottomNodesCache, and the OTSCache (when implemented).

In some implementations, certain state variables are maintained for managing a cryptographic hash tree. In some examples, the following state variables are maintained: (1) the OTS signing index q, (2) the state of the BottomNodesCache, and (3) the state of the TopNodesCache. Other variables may be maintained in some cases.

In some implementations, the signing index q represents the state of the hash-based signature scheme. The signing index q keeps track of the OTS signing keys that have been used to generate signatures to prevent their reuse. The signing index q is incremented by 1 for each signature computation, e.g., q=q+1. The value of the OTS signing index q indicates the index to be used for the next signature generation.

In some implementations, the state, and also the content, of BottomNodesCache and TopNodesCache change with each successive signature generation. For example, in some instances, the signing index q is used to determine the state of the caches, for example, to determine whether the cache requires updating, and in some instances, q is used to determine where certain nodes are located in the buffer.

In some implementations, the state of the caches, e.g. TopNodesCache and BottomNodesCache, produce an authentication path for a current signing index, q. In some instances, after signing, the caches are updated to a state that can produce an authentication path for the next value of the signing index q+1. In some cases, the update invalidates certain nodes in TopNodesCache and BottomNodesCache, and introduces another into the BottomNodesCache.

Figure 6:
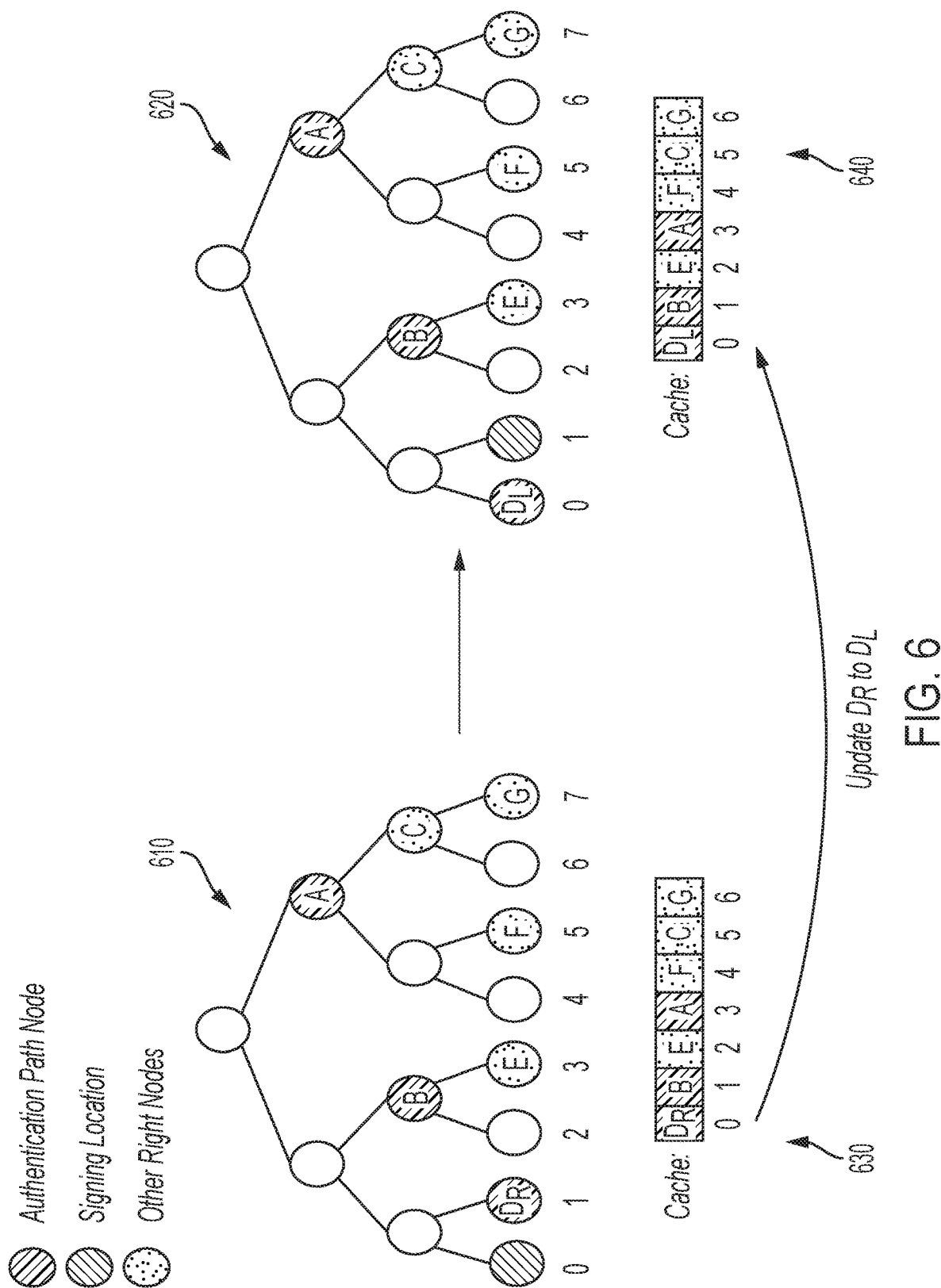
FIG. 6 illustrates an example update operation for an active subtree.

FIG. 6 illustrates an example update operation for an active subtree 610, 620. In this example, the signing index q is initialized to the index 0, shown in the subtree 610 on the left. After generating a digital signature for a current value of the signing index q=0 and updating the BottomNodesCache (from the state 630 on the left to the state 640 on the right), the signing index is incremented by 1 (e.g., q=q+1) to generate a digital signature for the next value of the signing index q=1, shown in subtree 620 on the right. As shown, in both states 630, 640, an authentication path can be found from the nodes in the BottomNodesCache. The difference in the state 630, 640 is that the right node DR will no longer be needed as a node in any future authentication paths, and therefore, is removed from the cache. The storage space previously used by node DR is overwritten in the cache with DL, its left sibling node. In some implementations of the update procedure, there will always be at least one right node that is removed and replaced with its left node counterpart. In this example, the other nodes in the cache remain unchanged when the cache is updated from state 630 to state 640.

In some implementations, indexing functions are used to manage a circular buffer storing the nodes in the BottomNodesCache. For example, the Sigma function is an example of a general purpose function for performing operations on the BottomNodesCache. These functions may be used at any point that a position index r of the circular buffer (e.g., storing the BottomNodesCache), needs to be determined. In the following, notations, '&' denotes a bitwise AND operation, '~a' denotes a bitwise NOT operation (unary) in two's complement, 'a|b' denotes a bitwise OR operation, and '|a|' denotes the absolute value of a.

In some cases, instead of using Eytzinger's method to map a binary tree into a linear array, an inverse function may be used to map a binary tree to the circular buffer using inverse lexicographic ordering for the BottomNodesCache. In some examples, to map an integer x into inverse lexicographic order (e.g., as shown in FIG. 3B), the function r=Sigma (x) operates as follows, where r is the index position in the circular buffer:

1. Let r=0.
2. If x>0, then:
   a. Let t=Ham (x/2), where Ham computes the Hamming Weight of x/2.
   b. Let $c=2^{CTZ(x)}$, where CTZ returns the number of trailing zeroes in the binary form of x.
   c. Let $b=\lfloor c/2 \rfloor \times 2$.
   d. Set r=x−t+b.
3. Return r.

For example, using the above function, the result of mapping integers, x={0, 1, 2, 3, 4, 5, 6, 7, . . . }, will yield the integers r={0, 1, 3, 2, 7, 4, 6, 5, . . . }, as illustrated in FIGS. 3B and 5.

In some implementations, a function is used to find indices within a circular buffer for insertion and deletion of nodes. For example, the function Delta(q, h) may be used to determine an index in the BottomNodesCache, where q is a signing index position within an active or future subtree and h is the level within the corresponding subtree starting from the leaf level and going upward. The function Delta(q,h) may operate as follows:

1. Let $s=2^K+(K-2)$, the size of the circular buffer.
2. Let $a=\sim(2^h-1)$.
3. Let $b=(q \ \& \ a)|(2^h)$.
4. Let $c=b \ \& \ (2^K-1)$.
5. Let d=Sigma(c)−1.
6. If $\lfloor q/2^K \rfloor$ is odd, then
   a. Let e=−(d+1).
   b. Let $f=e+2^{K+1}-2$.
   c. Let g=f mod s.
   d. Return g.
7. Else:
   a. Return d.

In some implementations, a function is used to obtain an authentication path node from a circular buffer. For example, the function GetAuthPathIndex(q,n) returns the index r of an authentication path node within the circular buffer. Using q, the current value of the signing index, this function returns the index r within the circular buffer corresponding to the n-th node in the authentication path. In some instances, n is the number of nodes in the authentication node path, and this function will be performed n times with the same value of the signing index q to read out each authentication path node. In some implementations, the function GetAuthPathIndex(q,n) operates as follows:

1. Let r=Delta(q, n).
2. Return r.

In some implementations, a function r=GetInsertIndex(q') is used to map a leaf node index q' of a future subtree to an index r within the circular buffer for node insertion, e.g., for node insertion into the future subtree portion of the BottomNodesCache. In an example, the GetInsertIndex(q) function uses the GetAuthPathIndex function (described above) to determine the index r for node insertion, as follows:

1. Let n=CTZ(q').
2. Let a=q'−1.
3. Let r=Delta(a,n).
4. Return r.

In some implementations, a function is used to determine the next new leaf index to be created. For example, the function r=GetNextLeafCalcIndex(q) returns the index r in a circular buffer where the next leaf will be created in a subtree, e.g. a new node of the future subtree. The function uses the current value of the signing index q as input. In some implementations, the r=GetNextLeafCalcIndex(q) function may operate as follows:

1. Let $a=\lfloor q/2^K \rfloor$.
2. Let $b=q \ \& \ (2^K-1)$.
3. Let c=1 if b=0, otherwise c=0.
4. Let $d=(a+c) \times 2^K$.
5. Let $e=(2^K-b) \ \& \ (2^K-1)$.
6. Let r=d|e.
7. Return r.

In some examples of this function, when the number of lower levels K=3, for the input q={0, 1, 2, 3, 4, 5, 6, 7, . . . } the result r={0, 15, 14, 13, 12, 11, 10, 9, . . . } is produced. This example illustrates that while the value of the signing index q progresses linearly, the resulting r leaf nodes are created in reverse order. In this case, the signing index q is associated with a leaf node in the active subtree covering the span of $0 \rightarrow 2^K-1$ nodes, while r is an index associated with a leaf node in the future subtree covering the span of $2^K \rightarrow 2^{K+1}-1$. As shown in this example, the future subtree is built in descending order (backwards) using $TreeHash_v$ function.

In some implementations, a function is used to replace a certain right node with its left node sibling during an update after an OTS signing. For example, the procedure may update bottom level nodes in the Active subtree as described with respect to FIG. 6. In some cases, the procedure updates top nodes in TopNodesCache. In some examples, the function r=UpdateCaches(q) uses q, the current signing index, as input and operates as follows:

1. Let τ=CTZ(q+1).
2. Let $n=Node_q^0$, the leaf node at q.
3. Let a=q.
4. Let s=min (τ−1, H−2).
5. For h=0→s:
   a. Let a=a⊕1.
   b. Let $m=Node_a^h$, the sibling node to n on level h.
   c. Compute the parent node n=Hash (m∥n) if a is odd, otherwise, n=Hash (n∥m).
   d. Let $a=\lfloor a/2 \rfloor$.
6. If s≤K, then:
   a. Let i=GetAuthPathIndex (q, s).
   b. Delete node from the circular buffer at index i.
   c. Insert n into the circular buffer at index i.
7. Else if s≥K, then:
   a. Let $i=2^{H-s-1}-1+\lfloor q/2^s \rfloor$.
   b. Delete node from TopNodesCache at index i.
   c. Insert n into the TopNodesCache at index i.

In some implementations, step 7(a) of r=UpdateCaches(q) function shown above, when updating TopNodesCache, uses Eytzinger's method to determine the position index for storing the node.

In some implementations, a hash-based signature scheme is initialized as follows. A hash-based signature scheme key pair (e.g. full hash tree and all OTS keys) is generated, and the TopNodesCache and BottomNodesCache are initialized. In some instances, during initialization, all of the right nodes of the top part of the tree (above the cutoff level) are stored in the TopNodesCache sequentially, from level H to level H−K. In some cases, nodes are inserted into a position in the TopNodesCache, for example, using Eytzinger's method as described with respect to FIG. 3A. In some cases, the BottomNodesCache is initialized with selected node values for the first active subtree. In some instances, the right nodes of the active subtree are inserted into the BottomNodesCache, e.g., using the GetInsertIndex(q) function and as shown in FIG. 3B. In some implementations, the root of the hash tree is the public key of the hash-based signature scheme. Thus, the root node value may be returned as the public key. In some cases, all unused intermediate nodes, e.g., nodes not stored in TopNodesCache or BottomNodesCache, are removed from memory. In some instances, the signing index q is initialized to 0. In some implementations, the OTS signing keys may be stored if they are not recoverable. In instances that the signing keys are recoverable, the seed may be stored.

In some implementations, after initialization, the hash-based signature scheme generates a digital signature. In some instances, an OTS algorithm is used to generate a one-time signature for signing index q, $OTS\_Sig_q=OTSSIG$ (m, $SigKey_q$). In some cases, an authentication path, $AuthPath_q$, is computed using the functions for the TopNodesCache and the BottomNodesCache as described above. For example, the authentication path for signing index q may be computed with the following function:
1. For h=0→(K−1):
 a. Let r=GetAuthPathIndex(q,h).
 b. $AuthPath_q^h=BottomNodesCache_r$.
2. For h=K→(H−2):
 a. Let $i=\lfloor q/2^{h+1} \rfloor$.
 b. Let $b=i+2^h-1$.
 c. $AuthPath_q^h=TopNodesCache_b$.
3. Return $AuthPath_q$.

In some cases, reading from TopNodesCache in step 2 above follows Eytzinger's method. In some implementations, a leaf node within the future subtree of BottomNodesCache is generated using the indexing functions, for example, as described above (e.g., during an update after signing). In some examples, the following function is used to generate the leaf node and store the leaf node in the appropriate index location r of BottomNodesCache:
1. Let r=GetInsertIndex ($q+2^K-1$).
2. Let s=GetNextLeafCalcIndex (q mod $2^K$).
3. If a mod $2^K \neq 0$ and $r<2^H$ then:
 a. Let h=CTZ (s+1).
 b. $Node_s^0$=LeafCalc (s). /* generate leaf node at index s
 c. $Node_s^h$=TreeHash$_v$ (h,s). /*generate intermediate node
 d. $BottomNodesCache_r=Node_s^h$.

In some instances, the one-time signature is composed using $OTS\_Sig_q$, $AuthPath_q$, and q, (e.g. Sig=(q, $OTS\_Sig_q$, $AuthPath_q$)). In some cases, using Nod computed during OTS signature generation, the TopNodesCache and BottomNodesCache are updated using the index function UpdateCaches(q), and the signing index a is advanced to the next value (e.g., q=q+1).

Figure 7:
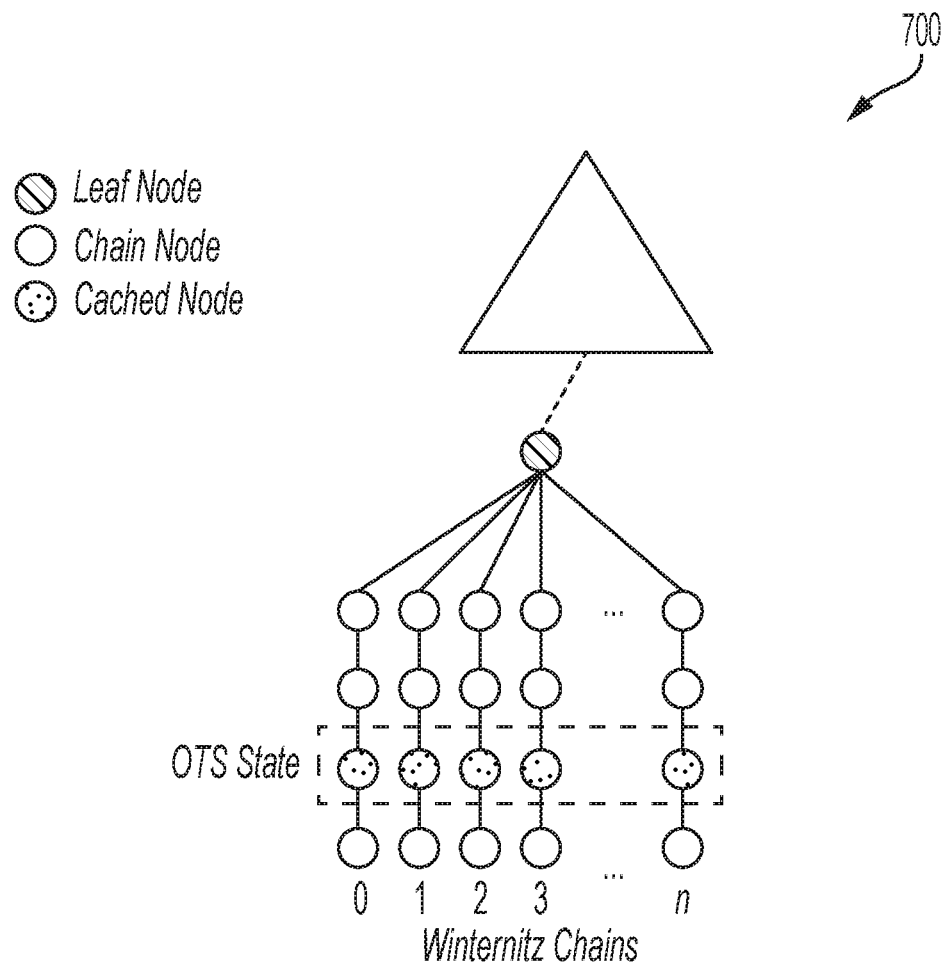
FIG. 7 illustrates an example OTS State.

In some cases, the hash-based signature scheme can use an additional storage location, OTSCache, producing a system of caches that work in tandem to reduce CPU utilization at a cost in storage usage. As shown in FIG. 7, intermediate nodes from a Winternitz chain for a leaf node in a hash tree 700 are selected and combined in an OTS state. Multiple OTS states may then be combined in a single, contiguous storage locations, OTSCache. The OTS state aids in the creation of a signature by reducing the number of hash function invocations per chain. When signing, the implementation of the OTS scheme decides whether to begin computation from the bottom of the chain or whether to start from a cached node within OTSCache.

In some implementations, the OTSCache is used and updated in tandem with the active and future subtree portions of BottomNodesCache. For example, when signing, the active subtree portion provides part of an authentication path for a given leaf node at index q. In some instances, to facilitate the computation of an OTS, the OTSCache is queried for an OTS state at q. The resulting OTS and authentication path are coupled to generate a one-time signature.

In some instances, upon signing, one new leaf node of the future subtree is generated. As part of generating a new leaf node, an OTS verification key is computed. In some cases, as part of that computation, an OTS state is generated and inserted into the OTSCache. In other words, the OTS state is a byproduct of a leaf computation. In some cases, this allows a system implementing BottomNodesCache to use an OTSCache seamlessly, particularly to remove OTS states during singing and inserting new OTS states during a tree update. In some cases, the BottomNodesCache handles inserting new OTS states into the OTSCache, while the OTS generation process handles removing them.

In some implementations, a selection of OTS states may be stored in an OTSCache. In some cases, OTS states may be generated as a product of right node calculations in the K levels. In some cases, OTSCache may be used to speed up signature calculation and verification key generation. For example, instead of repeatedly applying a hash operation on the signing key for the size of Winternitz window, e.g. when implementing a Winternitz OTS state shown in FIG. 7, a corresponding verification key may be computed by applying fewer hash operations to the OTS state.

In some implementations, the OTSCache may be initialized during system initialization, and updated after OTS signings in order to maximize storage efficiency. In some cases, OTSCache is initialized after initialization of TopNodesCache and BottomNodesCache and before initialization of the OTS index q. In some cases, the OTSCache is populated with $2^K-1$ OTS states that fall under the first K-sized subtree, e.g. the active subtree. In some instances, the OTSCache is constant in size. For example, in some implementations, the OTSCache is initially comprised of OTS states corresponding to the leaf nodes at locations: InitLeaves=$\{1, 2, \ldots, 2^K-1\}$. In some cases, the OTS state at location 0 is omitted. In some instances, OTSCache will not exceed $2^K-1$ OTS states, even in the initial OTSCache configuration. FIG. 7 illustrates an example of the initial OTS states that may stored in the OTSCache, shown highlighted in the figure.

Figure 8:
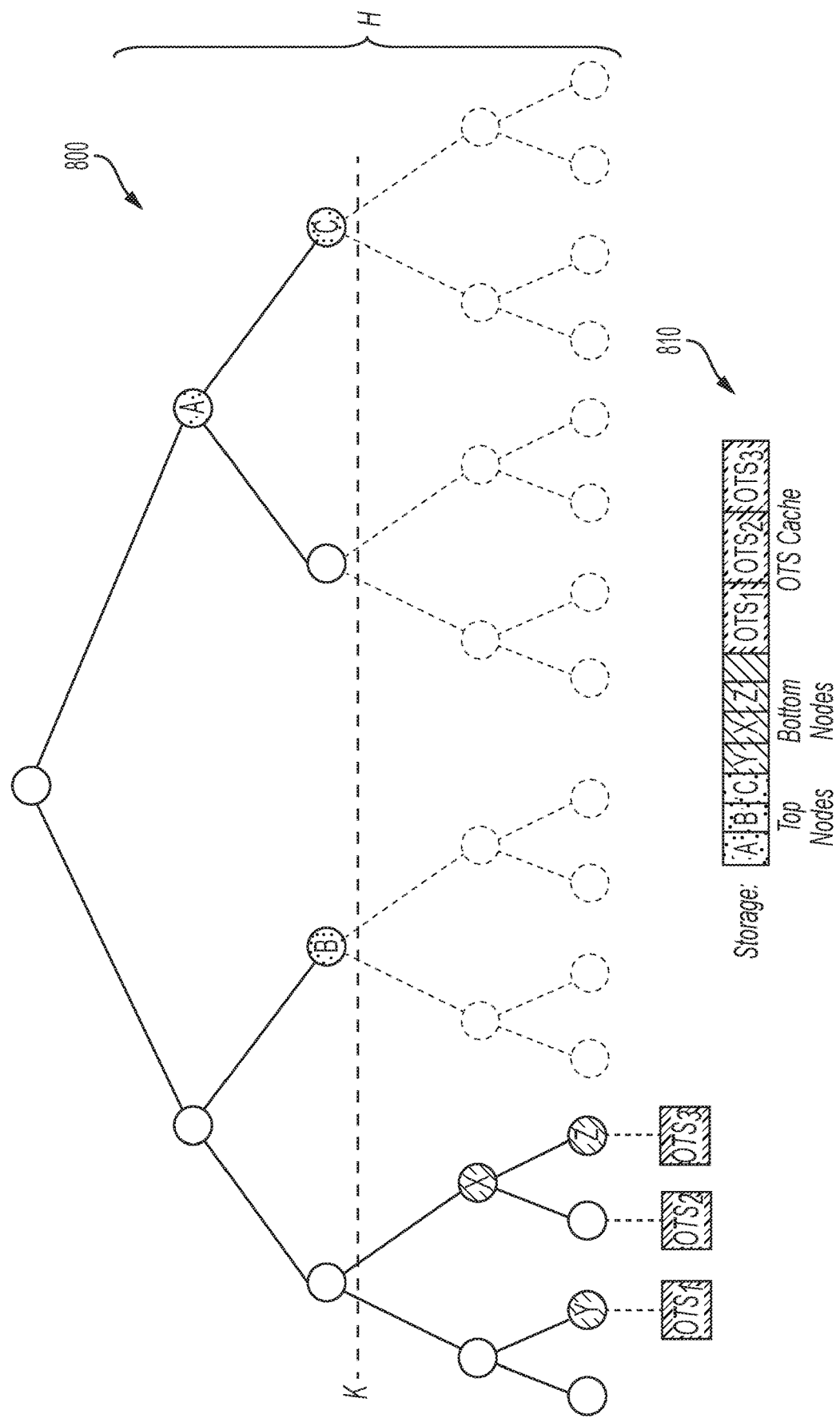
FIG. 8 illustrates an example storage scheme for OTS states associated with a cryptographic hash tree.

FIG. 8 illustrates an example storage scheme 810 for OTS states associated with a cryptographic hash tree 800. In this example, the hash tree 800 is of height H=4 with cutoff level of K=2. As shown, the storage scheme 810 uses a TopNodesCache concatenated with a BottomNodesCache, concatenated with an OTSCache. In this example, the TopNodesCache has memory space for $2^{H-K-1}-1$ nodes, the BottomNodesCache has memory space for $2^K+(K-2)$ nodes, and the OTS cache requires space for $2^K-1$ OTS states. Because the sizes of these caches are static in this example, they can be concatenated together as shown in FIG. 8.

In some cases, the OTSCache is a linear array of OTS states. In some instances, upon generating a digital signature, the OTSCache is queried for an OTS state to aide in signature computation. Once the OTS state is used, it is no longer needed and the space it used within the cache maybe be relinquished. In some cases, the r=GetOTSCacheIndex (q) function is used to determine the index r of the OTS state location in the OTSCache. The function may operate as follows:
1. Let a=q & $(2^K-1)$.
2. Let $b=2^K$ if $\lfloor q/2K \rfloor$ is odd, otherwise b=0.
3. Let r=|a−b|−1.
4. Return r.

In cases where a mod $2^K \neq 0$, the r=GetOTSCacheIndex(q) function may be used to obtain the index of OTS cache storing the OTS state for signing index q. In such cases, the OTS state is used in the signature computation, as follows:

$$OTSState_q = OTSCache_r.$$

$$OTS\_Sig_q = OTSSIG(m, SigKey_q, OTSState_q)$$

In some cases, the OTS state can also be used to compute the leaf node at q. For example, when the OTS state is available, a leaf node may be computed as follows:

$$Node_q^0 = LeafCalc(q, OTSState_q)$$

In cases where a mod $2^K = 0$, the OTS cache may not have an OTS state to use. In such cases, the digital signature may be calculated from the seed values, as if the OTS cache was not used for the key pair.

In some cases, the OTSCache is updated with a new OTS state at position index r. In a hash-based signature scheme that uses and keeps track of the OTS state, functions may be used to generate the new OTS state. For instance, functions that are used to update the OTSCache may include variants of the example functions that are used to generate and store a new node in a future subtree described. For example, the update may proceed as follows:
1. Let r=GetNextInsertIndex(q+$2^K$−1).
2. Let s=GetNextLeafCalcIndex(q) mod $2^K$.
3. Let t=GetOTSCacheIndex(q).
4. If q mod $2^K \neq 0$ and $r<2^H$ then:
   a. Let h=CTZ(s+1).
   b. OTSStates=GenOTSState(s). /* generate new OTS state
   c. $Node_s^0$=LeafCalc (s). /* generate new leaf node
   d. $Node_s^h$=TreeHash$_v$($Node_s^0$, s). /* generate new Future subtree node
   e. BottomNodesCache$_r$=$Node_s^h$.
   f. OTSCache$_t$=OTSState$_s$.

Figure 9:
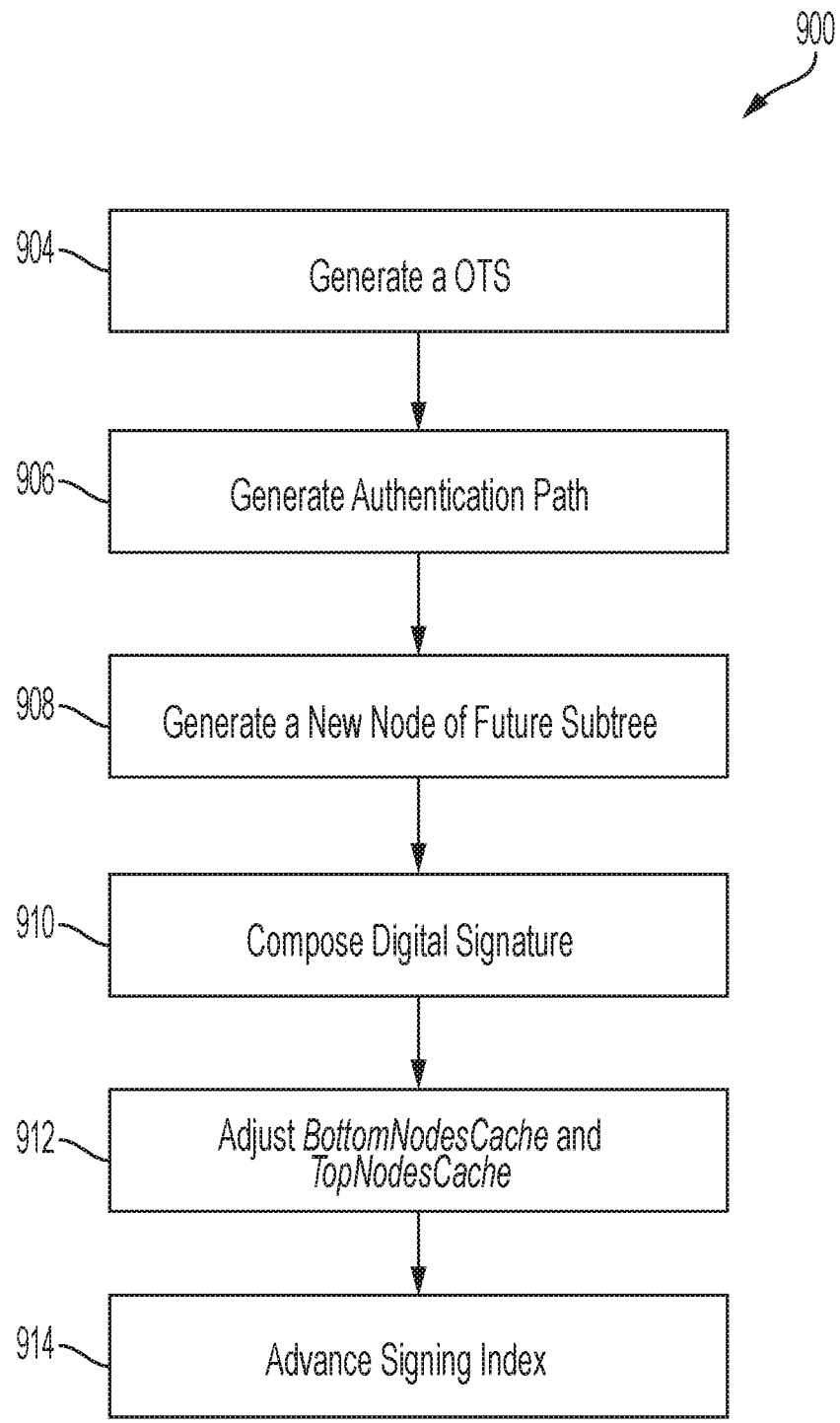
FIG. 9 is a flow diagram illustrating an example process for a hash-based digital signature scheme.

FIG. 9 is a flow diagram illustrating an example process 900 for a hash-based digital signature scheme. The example process 900 can be performed, for example, by computer systems that can exchange information over a communication channel. For instance, operations in the process 900 may be performed by the devices 102, 104 in the example communication system 100 shown in FIG. 1 or in another type of system. As an example, a signing device may be device 102 of FIG. 1 and a verifying device may be device 104 of FIG. 1. The example process 900 may include additional or different operations, and the operations may be performed in the order shown or in another order. In some cases, one or more of the operations shown in FIG. 9 are implemented as processes that include multiple operations, sub-processes or other types of routines. In some cases, operations can be combined, performed in parallel, iterated or otherwise repeated or performed in another manner.

In some implementations, one or more caches are initialized with nodes of a cryptographic hash tree (e.g., a subset of the nodes of the Merkle tree). A first subset of nodes of an active subtree may be stored in a first set of indexed locations in a cache memory, and a second subset of nodes of a future subtree may be stored in a second set of indexed locations in the cache memory. The active subtree and the future subtree are non-overlapping nodes of the cryptographic hash tree, and each subtree includes nodes below a cut-off level of the hash tree. In some implementations, the cache memory is a circular buffer memory. In some examples, the first subset of nodes of the active subtree are right nodes of the active subtree, e.g., the right nodes of subtree 300B shown in FIG. 3B. In some cases, the first set of indexed locations are contiguous locations in a circular buffer memory (e.g., indexed locations 3, 4, and 5 of BottomNodesCache 410 in FIG. 4). In some implementations, the nodes are ordered in the indexed locations according to respective lifetime of each node. For example, FIG. 3B illustrates that the node D will be used first, the node B will be used second, while the node G will be used last, and the nodes are ordered accordingly when stored in BottomNodesCache 330B. In some cases, the second set of indexed locations are contiguous locations in a circular buffer memory (e.g., indexed locations 8, 0, and 1 of BottomNodesCache 410 in FIG. 4). In some cases, a second cache memory is populated with right nodes for levels above a cut-off level of the cryptographic hash tree (e.g., the TopNodesCache shown in FIG. 2B), and a third cache array is populated with OTS states for an active subtree.

In some instances, the first set of indexed locations and the second set of indexed locations shift to the right as nodes are used in the active subtree. For example, in FIG. 4, the indices storing nodes of the Future subtree shifted to the right such that the end of the memory was reached, and the Future subtree indices wrap around to the indices of the memory, BottomNodesCache 410. Also in BottomNodesCache 410, nodes for Active subtree and the Future subtree are stored in contiguous locations in the memory. In some cases, when the nodes are depleted in the first set of indexed locations of cached memory associated with the active subtree, the nodes in the second portion of the cache memory associated with the future subtree become the active subtree nodes.

At 904, a one-time signature (OTS) is generated for a current signing index. In some instances, the current signing index is associated with the active subtree, e.g. as shown in FIG. 4.

At 906, an authentication path for the OTS is generated. In some cases, the authentication path includes one or more nodes retrieved from one or more of the first set of indexed locations of the cache memory. In the example shown in FIG. 4, the authentication path includes nodes A, F, and C of the active subtree, and the nodes are retrieved from the BottomNodesCache 410 at indices 3, 4, and 5. In some cases, the authentication path includes one or more nodes above the cut-off level of the cryptographic hash tree. In the example shown in FIG. 4, the authentication path includes a node 420 above the cut-off level K for the signing index 4.

At 908, a new node of a future subtree is generated. In some cases, as the hash-based signature scheme progresses through sequential values of the signing index, the new nodes of the future subtree are generated in reverse order of the cryptographic hash tree node order. FIG. 5 shows an example of a reverse order of creation of nodes, and FIG. 4 provides an example in which the last nodes Z, X, and Y of the future subtree are generated first, e.g., using the Sigma function above. In some cases, calculating the new node only requires one new leaf node of the cryptographic hash tree to be generated. In some cases, the new node is stored in the cache memory and becomes one of the second subset of nodes of the future subtree. For example, the new node may be stored in a location in the circular buffer memory such that when the future subtree becomes the active subtree, the nodes may be traversed in order, e.g., as shown in the active subtree portion of hash tree 400.

At 910, the digital signature is generated including the OTS and the authentication path. In some examples, the digital signature is a signature on a message to be communicated from a signing entity to a verifying entity. For instance, in the example shown in FIG. 1, the device 102 may generate a digital signature based on a message for the other device 104. The digital signature (along with the authentication path and the public key) allows the verifying entity to verify the authenticity of the message from the signing entity, for example, to verify that the message was not altered or corrupted.

The digital signature and the authentication path may then be provided for transmission in a communication system. For instance, in the example shown in FIG. 1, the device 102 may provide information for transmission over the channel 106 to the other device 104. The digital signature and the authentication path may be sent, for example, from the signing entity to the verifying entity. In some cases, the digital signature and the authentication path are sent in association with a message that can be verified using the digital signature and the authentication path.

At 912, the cache memories are updated. For example, one or more of the BottomNodesCache, the TopNodesCache and the OTSCache may be updated. For example, the UpdateCaches function above may be used to update the BottomNodesCache the TopNodesCache.

At 914, the current signing index is advanced to the next signing index. The advancement of the signing index changes the signing index to a value associated with the next signing key for OTS generation. In some cases, the signing index q is advanced to the next value by incrementing q by 1, e.g., q=q+1. For example, FIG. 6 illustrates the changes made from state 630 associated with signing index value 0 to state 640 associated with signing index value 1. In some cases, an index associated with a right node in the first set of indexed locations of the active subtree is determined, and the right node is replaced with its left sibling node. As shown in the example of FIG. 6, the right node $D_R$ at index 0 of the cache memory is replaced with its sibling left node $D_L$ at index 0 of the cache memory since the right node will no longer be used in an authentication path.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, e.g., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored in memory (e.g., on one or more computer-readable storage devices) or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. In some instances, the data processing apparatus includes a set of processors. The set of processors may be co-located (e.g., multiple processors in the same computing device) or located in different location from one another (e.g., multiple processors in distributed computing devices). The memory storing the data executed by the data processing apparatus may be co-located with the data processing apparatus (e.g., a computing device executing instructions stored in memory of the same computing device), or located in a different location from the data processing apparatus (e.g., a client device executing instructions stored on a server device).

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, a tablet computer, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a stylus, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. The communication network may include one or more of a local area network ("LAN") and a wide area network ("WAN"), an internetwork (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of the examples described here, a digital signature scheme stores nodes of a cryptographic hash tree in a buffer memory.

In a first example, nodes of a cryptographic hash tree are stored in a buffer memory. Storing the nodes in the buffer memory includes storing a first subset of nodes of an active subtree in a first set of indexed locations in the buffer memory, and storing a second subset of nodes of a future subtree in a second set of indexed locations in the buffer memory. The active subtree and the future subtree are non-overlapping subtrees of the same size. A one-time signature (OTS) is generated based on a signing key associated with a current value of a signing index. The current value of the signing index is also associated with a current leaf node of the active subtree. An authentication path for the OTS is generated based on the current value of the signing index. Generating the authentication path includes retrieving one or more of the first subset of nodes from the buffer memory. A digital signature that includes the OTS and the authentication path is provided for transmission to a message recipient. A new node of the future subtree is calculated based on the current value of the signing index. The new node of the future subtree is stored in the buffer memory. The signing index is then advanced from the current value to a next value of the signing index.

Implementations of the first example may include one or more of the following features. A right node, which has been stored in a first memory location of the first set of indexed locations, is identified. The right node is replaced with its left sibling node in the first memory location. The active subtree and the future subtree are subtrees of height K, and the total number of nodes in the first and second subsets of nodes is equal to $2^K+(K-2)$.

Implementations of the first example may include one or more of the following features. The buffer memory is a bottom nodes cache; the active subtree and the future subtree each include nodes below a cut-off level of the cryptographic hash tree; and generating the authentication path includes retrieving, from a top nodes cache, one or more nodes above the cut-off level of the cryptographic hash tree. OTS states associated with the active subtree can be stored in an OTS cache; and generating the OTS signature can include using one or more of the OTS states associated with the current value of the signing index. A right node stored in a first memory location of the top nodes cache may be identified; and the right node may be replaced in the first memory location by storing its left sibling node in the first memory location.

Implementations of the first example may include one or more of the following features. The buffer memory can be a circular buffer memory. The first set of indexed locations can be contiguous within the circular buffer memory, and the second set of indexed locations can be contiguous within the circular buffer memory. Storing the new node of the future subtree in the circular buffer memory can shift a boundary between the first and second sets of indexed locations in the circular buffer memory. Storing the new node of the future subtree in the buffer memory may deplete the nodes of the active subtree from the buffer memory, and the next value of the signing index may be associated with a leaf node in the future subtree. The future subtree may then become the active subtree (e.g., for generating the next OTS based on the next value of the signing index.

Implementations of the first example may include one or more of the following features. Storing the new node of the future subtree in the buffer memory includes storing the new node in a first memory location associated with a first index value. The first index value may be identified based on the current value of the signing index (e.g., using r=GetInsertIndex(q+$2^K$−1) as described above, or using another function). Calculating the new node of the future subtree based on the current value of the signing index may include identifying an index of a leaf node of the future subtree based on the current value of the signing index (e.g., using s=GetNextLeafCalcIndex(q) mod $2^K$ as described above, or using another function); and calculating the new node of the future subtree based on the index of the leaf node (e.g., using Node$_s^h$=TreeHash$_v$(h, s) as described above, or using another function).

Implementations of the first example may include one or more of the following features. The operations of the first example may be executed according to a hash-based signature scheme. The hash-based signature scheme may calculate new leaf node of the future subtree in reverse order (e.g., descending) as the value of the signing index advances (e.g., increases) through a sequence of values. The hash-based signature scheme may calculate each new node of the future subtree based on a respective current value of the signing index. The hash-based signature scheme may store and access nodes of the active and future subtrees in the buffer memory such that calculating each new node of the future subtree requires calculating only one leaf node of the cryptographic hash tree.

In some implementations, a computing system includes one or more processors and memory storing instructions that are operable when executed by the one or more processors to perform one or more operations of the first example. In some implementations, a computer-readable medium stores instructions that are operable when executed by a data processing apparatus to perform one or more operations of the first example.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method comprising:
   storing nodes of a cryptographic hash tree in a buffer memory, wherein storing the nodes in the buffer memory comprises:
      storing a first subset of nodes of an active subtree in a first set of indexed locations in the buffer memory; and
      storing a second subset of nodes of a future subtree in a second set of indexed locations in the buffer memory, wherein the active subtree and the future subtree are non-overlapping subtrees of the same size;
   generating a one-time signature (OTS) based on a signing key associated with a current value of a signing index, wherein the current value of the signing index is associated with a current leaf node of the active subtree;
   generating an authentication path for the OTS based on the current value of the signing index, wherein generating the authentication path comprises retrieving one or more of the first subset of nodes from the buffer memory;
   providing a digital signature for transmission to a message recipient, the digital signature comprising the OTS and the authentication path;
   calculating a new node of the future subtree based on the current value of the signing index;
   storing the new node of the future subtree in the buffer memory; and
   advancing the signing index from the current value to a next value of the signing index.

2. The method of claim 1, comprising:
   identifying a right node stored in a first memory location of the first set of indexed locations;
   replacing the right node with its left sibling node in the first memory location.

3. The method of claim 1, wherein the active subtree and the future subtree are subtrees of height K, and the total number of nodes in the first and second subsets of nodes is equal to $2^K+(K-2)$.

4. The method of claim 1, wherein:
   the buffer memory comprises a bottom nodes cache;
   the active subtree and the future subtree each include nodes below a cut-off level of the cryptographic hash tree; and
   generating the authentication path comprises retrieving, from a top nodes cache, one or more nodes above the cut-off level of the cryptographic hash tree.

5. The method of claim 4, comprising storing OTS states associated with the active subtree in an OTS cache, wherein generating the OTS signature comprises using one or more of the OTS states associated with the current value of the signing index.

6. The method of claim 4, comprising:
   identifying a right node stored in a first memory location of the top nodes cache;
   replacing the right node with its left sibling node in the first memory location.

7. The method of claim 1, wherein the buffer memory comprises a circular buffer memory, the first set of indexed locations are contiguous and the second set of indexed locations are contiguous.

8. The method of claim 7, wherein storing the new node of the future subtree in the buffer memory depletes the nodes of the active subtree from the buffer memory, and the next value of the signing index is associated with a leaf node in the future subtree.

9. The method of claim 1, wherein storing the new node of the future subtree in the buffer memory comprises storing the new node in a first memory location associated with a first index value, and the method comprises identifying the first index value based on the current value of the signing index.

10. The method of claim 1, wherein calculating a new node of the future subtree based on the current value of the signing index comprises:
    identifying an index of a leaf node of the future subtree based on the current value of the signing index; and
    calculating the new node of the future subtree based on the index of the leaf node.

11. The method of claim 1, wherein the method is executed according to a hash-based signature scheme that calculates new leaf nodes of the future subtree in reverse order as the value of the signing index advances through a sequence of values.

12. The method of claim 11, wherein, according to the hash-based signature scheme, each new node of the future subtree is calculated based on a respective current value of the signing index, and calculating each new node of the future subtree requires calculating only one leaf node of the cryptographic hash tree.

13. A computer system, comprising:
    a buffer memory;
    one or more processors; and
    memory storing instructions that are operable when executed by the one or more processors to perform operations comprising:
       storing nodes of a cryptographic hash tree in the buffer memory, wherein storing the nodes in the buffer memory comprises:

storing a first subset of nodes of an active subtree in a first set of indexed locations in the buffer memory; and storing a second subset of nodes of a future subtree in a second set of indexed locations in the buffer memory, wherein the active subtree and the future subtree are non-overlapping subtrees of the same size;

generating a one-time signature (OTS) based on a signing key associated with a current value of a signing index, wherein the current value of the signing index is associated with a current leaf node of the active subtree;

generating an authentication path for the OTS based on the current value of the signing index, wherein generating the authentication path comprises retrieving one or more of the first subset of nodes from the buffer memory;

providing a digital signature for transmission to a message recipient, the digital signature comprising the OTS and the authentication path;

calculating a new node of the future subtree based on the current value of the signing index;

storing the new node of the future subtree in the buffer memory; and advancing the signing index from the current value to a next value of the signing index.

14. The computer system of claim 13, the operations comprising:
identifying a right node stored in the buffer memory at a first memory location of the first set of indexed locations;
replacing the right node with its left sibling node in the first memory location.

15. The computer system of claim 13, wherein the active subtree and the future subtree are subtrees of height K, and the total number of nodes in the first and second subsets of nodes is equal to $2^K+(K-2)$.

16. The computer system of claim 13, wherein:
the buffer memory is a first buffer memory comprising a bottom nodes cache;
the system further comprises a second buffer memory comprising a top nodes cache:
the active subtree and the future subtree each include nodes below a cut-off level of the cryptographic hash tree; and
generating the authentication path comprises retrieving, from the top nodes cache, one or more nodes above the cut-off level of the cryptographic hash tree.

17. The computer system of claim 16, the operations comprising storing OTS states associated with the active subtree in an OTS cache, wherein generating the OTS signature comprises using one or more of the OTS states associated with the current value of the signing index.

18. The computer system of claim 16, the operations comprising:
identifying a right node stored in a first memory location of the top nodes cache;
replacing the right node with its left sibling node in the first memory location.

19. The computer system of claim 13, wherein the buffer memory comprises a circular buffer memory, the first set of indexed locations are contiguous and the second set of indexed locations are contiguous, and storing the new node of the future subtree in the circular buffer memory shifts a boundary between the first and second sets of indexed locations in the circular buffer memory.

20. The computer system of claim 13, calculating a new node of the future subtree based on the current value of the signing index comprises:
identifying an index of a leaf node of the future subtree based on the current value of the signing index; and
calculating the new node of the future subtree based on the index of the leaf node; and
storing the new node of the future subtree in the buffer memory comprises storing the new node in a first memory location associated with a first index value, and the operations comprise identifying the first index value based on the current value of the signing index.

21. The computer system of claim 13, wherein:
the operations are executed according to a hash-based signature scheme that calculates new leaf nodes of the future subtree in reverse order as the value of the signing index advances through a sequence of values; and
according to the hash-based signature scheme:
each new node of the future subtree is calculated based on a respective current value of the signing index; and
calculating each new node of the future subtree requires calculating only one leaf node of the cryptographic hash tree.

22. A non-transitory computer-readable medium storing instructions that are operable when executed by data processing apparatus to perform operations comprising:
storing nodes of a cryptographic hash tree in a buffer memory, wherein storing the nodes in the buffer memory comprises:
storing a first subset of nodes of an active subtree in a first set of indexed locations in the buffer memory; and
storing a second subset of nodes of a future subtree in a second set of indexed locations in the buffer memory, wherein the active subtree and the future subtree are non-overlapping subtrees of the same size;
generating a one-time signature (OTS) based on a signing key associated with a current value of a signing index, wherein the current value of the signing index is associated with a current leaf node of the active subtree;
generating an authentication path for the OTS based on the current value of the signing index, wherein generating the authentication path comprises retrieving one or more of the first subset of nodes from the buffer memory;
providing a digital signature for transmission to a message recipient, the digital signature comprising the OTS and the authentication path;
calculating a new node of the future subtree based on the current value of the signing index;
storing the new node of the future subtree in the buffer memory; and
advancing the signing index from the current value to a next value of the signing index.

23. The computer-readable medium of claim 22, further comprising:
identifying a right node stored in a first memory location of the first set of indexed locations;
replacing the right node with its left sibling node in the first memory location.

24. The computer-readable medium of claim 22, wherein the active subtree and the future subtree are subtrees of height K, and the total number of nodes in the first and second subsets of nodes is equal to $2^K+(K-2)$.

25. The computer-readable medium of claim 22, wherein:
the buffer memory comprises a bottom nodes cache;
the active subtree and the future subtree each include nodes below a cut-off level K; and
generating the authentication path comprises retrieving, from a top nodes cache, one or more nodes above the cut-off level of the cryptographic hash tree.

26. The computer-readable medium of claim 25, the operations comprising storing OTS states associated with the active subtree in an OTS cache, wherein generating the OTS signature comprises using one or more of the OTS states associated with the current value of the signing index.

27. The computer-readable medium of claim 25, the operations comprising:
identifying a right node stored in a first memory location of the top nodes cache;
replacing the right node with its left sibling node in the first memory location.

28. The computer-readable medium of claim 22, wherein the buffer memory comprises a circular buffer memory, the first set of indexed locations are contiguous and the second set of indexed locations are contiguous, and storing the new node of the future subtree in the circular buffer memory shifts a boundary between the first and second sets of indexed locations in the circular buffer memory.

29. The computer-readable medium of claim 22, wherein:
calculating a new node of the future subtree based on the current value of the signing index comprises:
identifying an index of a leaf node of the future subtree based on the current value of the signing index; and
calculating the new node of the future subtree based on the index of the leaf node; and
storing the new node of the future subtree in the buffer memory comprises storing the new node in a first memory location associated with a first index value, and the operations comprise identifying the first index value based on the current value of the signing index.

30. The computer-readable medium of claim 22, wherein:
the operations are executed according to a hash-based signature scheme that calculates new leaf nodes of the future subtree in reverse order as the value of the signing index advances through a sequence of values; and
according to the hash-based signature scheme:
each new node of the future subtree is calculated based on a respective current value of the signing index; and
calculating each new node of the future subtree requires calculating only one leaf node of the cryptographic hash tree.

* * * * *

UNITED STATES PATENT AND TRADEMARK OFFICE
CERTIFICATE OF CORRECTION

PATENT NO. : 10,581,616 B1
APPLICATION NO. : 16/508809
DATED : March 3, 2020
INVENTOR(S) : Paruzel It is certified that error appears in the above-identified patent and that said Letters Patent is hereby corrected as shown below:

In the Specification

Column 7, Line 14, delete "$2^{H-1}-1$." and insert -- $2^{H-i}-1$. -- therefor.

Column 7, Line 29, delete "$Node_j^i = Hash(Node_{2+j}^{i-1} \| Node_{2+j+1}^{i-1})$," and insert -- $Node_j^i = Hash(Node_{2*j}^{i-1} \| Node_{2*j+1}^{i-1})$ -- therefor.

Column 7, Line 37, delete "$OTS\_Ver_1$" and insert -- $OTS\_Ver_j$ -- therefor.

Column 8, Line 8, delete "Nod" and insert -- $Node_q^0$, -- therefor.

Column 11, Line 35, delete "TreeHash$_V$( )" and insert -- TreeHash$_v$( ) -- therefor.

Column 11, Line 42, delete "TreeHash$_V$( )" and insert -- TreeHash$_v$( ) -- therefor.

Column 13, Line 36, delete "$[q/2^K]$" and insert -- $\lfloor q/2^K \rfloor$ -- therefor.

Column 14, Line 46, delete "$s \leq K$," and insert -- $s < K$, -- therefor.

Column 15, Line 29, delete "$i = \lfloor q/2^{h+1} \rfloor$." and insert -- $i = [q/2^{h+1}]$ -- therefor.

Column 15, Line 43, delete "a" and insert -- q -- therefor.

Column 15, Line 52, delete "Nod" and insert -- $Node_q^0$ -- therefor.

Signed and Sealed this
Twelfth Day of January, 2021

Andrei Iancu
*Director of the United States Patent and Trademark Office*

CERTIFICATE OF CORRECTION (continued)
U.S. Pat. No. 10,581,616 B1

Column 15, Line 55, delete "a" and insert -- q -- therefor.

Column 17, Line 5, delete "⌊q/2K⌋" and insert -- $[q/2^K]$ -- therefor.

Column 17, Line 8, delete "a" and insert -- q -- therefor.

Column 17, Line 21, delete "a" and insert -- q -- therefor.

Column 17, Line 33, delete "r=GetNext1nsertIndex(q+2$^K$-1)." and insert -- GetNextInsertIndex(q+2$^K$-1). -- therefor.

Column 17, Line 38, delete "OTSStates=GenOTSState(s)." and insert -- OTSState$_s$=GenOTSState(s). -- therefor In the Claims Column 26, Line 60, Claim 23, before "computer-readable," insert -- non-transitory --.

Column 26, Line 66, Claim 24, before "computer-readable" insert -- non-transitory --.

Column 27, Line 3, Claim 25, before "computer-readable" insert -- non-transitory --.

Column 27, Line 10, Claim 26, before "computer-readable" insert -- non-transitory --.

Column 27, Line 15, Claim 27, before "computer-readable" insert -- non-transitory --.

Column 27, Line 21, Claim 28, before "computer-readable" insert -- non-transitory --.

Column 28, Line 1, Claim 29, before "computer-readable" insert -- non-transitory --.

Column 28, Line 13, Claim 30, before "computer-readable" insert -- non-transitory --.